US009286715B2

(12) United States Patent
Coon et al.

(10) Patent No.: US 9,286,715 B2
(45) Date of Patent: Mar. 15, 2016

(54) SYSTEMS AND METHODS FOR ADJUSTING A VIRTUAL TRY-ON

(71) Applicant: Glasses.Com Inc., Mason, OH (US)

(72) Inventors: Jonathan Coon, Austin, TX (US); Ryan Engle, Pflugerville, TX (US)

(73) Assignee: Glasses.com Inc., Mason, OH (US)

(*) Notice: Subject to any disclaimer, the term of this patent is extended or adjusted under 35 U.S.C. 154(b) by 0 days.

(21) Appl. No.: 13/775,785

(22) Filed: Feb. 25, 2013

(65) Prior Publication Data
US 2013/0321412 A1 Dec. 5, 2013

Related U.S. Application Data

(60) Provisional application No. 61/650,983, filed on May 23, 2012, provisional application No. 61/735,951, filed on Dec. 11, 2012.

(51) Int. Cl.
*G06T 17/00* (2006.01)
*G06T 19/20* (2011.01)
*G02C 13/00* (2006.01)

(52) U.S. Cl.
CPC .............. *G06T 17/00* (2013.01); *G02C 13/003* (2013.01); *G06T 19/20* (2013.01); *G06T 2219/2004* (2013.01)

(58) Field of Classification Search
CPC ..... A63F 13/10; A63F 2300/66; G06T 13/40; G06T 17/00; G06T 19/20; G06T 2219/2004; G02C 13/003
See application file for complete search history.

(56) References Cited

U.S. PATENT DOCUMENTS

| 3,927,933 | A | | 12/1975 | Humphrey |
|---|---|---|---|---|
| 4,370,058 | A | | 1/1983 | Trötscher et al. |
| 4,467,349 | A | | 8/1984 | Maloomian |
| 4,522,474 | A | | 6/1985 | Slavin |
| 4,534,650 | A | | 8/1985 | Clerget et al. |
| 4,539,585 | A | * | 9/1985 | Spackova et al. ............. 382/100 |
| 4,573,121 | A | | 2/1986 | Saigo et al. |
| 4,613,219 | A | | 9/1986 | Vogel |
| 4,698,564 | A | | 10/1987 | Slavin |

(Continued)

FOREIGN PATENT DOCUMENTS

| DE | 10007705 A1 | 9/2001 |
|---|---|---|
| EP | 0092364 A1 | 10/1983 |

(Continued)

OTHER PUBLICATIONS

PCT International Search Report for PCT International Patent Application No. PCT/US2013/042512, mailed Sep. 6, 2013.
PCT International Search Report for PCT International Patent Application No. PCT/US2013/042529, mailed Sep. 17, 2013.

(Continued)

*Primary Examiner* — Xiao Wu
*Assistant Examiner* — Chong Wu
(74) *Attorney, Agent, or Firm* — Holland & Hart LLP

(57) ABSTRACT

According to at least one embodiment, a computer-implemented method for generating a virtual try-on is described. A first model is obtained. The first model includes a first set of attachment points. A second model is obtained. The second model includes a first set of connection points. The first model and the second model are combined. Combining the first and second models includes matching the first set of attachment points with the first set of connection points. An image is rendered based on at least a portion of the combined first and second models.

22 Claims, 25 Drawing Sheets

(56) References Cited

U.S. PATENT DOCUMENTS

| | | |
|---|---|---|
| 4,724,617 A | 2/1988 | Logan et al. |
| 4,730,260 A | 3/1988 | Mori et al. |
| 4,781,452 A | 11/1988 | Ace |
| 4,786,160 A | 11/1988 | Fürter |
| 4,845,641 A | 7/1989 | Ninomiya et al. |
| 4,852,184 A | 7/1989 | Tamura et al. |
| 4,957,369 A | 9/1990 | Antonsson |
| 5,139,373 A | 8/1992 | Logan et al. |
| 5,255,352 A | 10/1993 | Falk |
| 5,257,198 A | 10/1993 | van Schoyck |
| 5,280,570 A | 1/1994 | Jordan |
| 5,281,957 A | 1/1994 | Schoolman |
| 5,428,448 A | 6/1995 | Albert-Garcia |
| 5,485,399 A | 1/1996 | Saigo et al. |
| 5,550,602 A | 8/1996 | Braeuning |
| 5,592,248 A | 1/1997 | Norton et al. |
| 5,631,718 A | 5/1997 | Markovitz et al. |
| 5,666,957 A | 9/1997 | Juto |
| 5,682,210 A | 10/1997 | Weirich |
| 5,720,649 A | 2/1998 | Gerber et al. |
| 5,724,522 A | 3/1998 | Kagami et al. |
| 5,774,129 A | 6/1998 | Poggio et al. |
| 5,809,580 A | 9/1998 | Arnette |
| 5,844,573 A | 12/1998 | Poggio et al. |
| 5,880,806 A | 3/1999 | Conway |
| 5,908,348 A | 6/1999 | Gottschald |
| 5,974,400 A | 10/1999 | Kagami et al. |
| 5,980,037 A | 11/1999 | Conway |
| 5,983,201 A | 11/1999 | Fay |
| 5,987,702 A | 11/1999 | Simioni |
| 5,988,862 A | 11/1999 | Kacyra et al. |
| D417,883 S | 12/1999 | Arnette |
| 6,016,150 A | 1/2000 | Lengyel et al. |
| 6,018,339 A | 1/2000 | Stevens |
| D420,037 S | 2/2000 | Conway |
| D420,379 S | 2/2000 | Conway |
| D420,380 S | 2/2000 | Simioni et al. |
| 6,024,444 A | 2/2000 | Little |
| D421,764 S | 3/2000 | Arnette |
| D422,011 S | 3/2000 | Conway |
| D422,014 S | 3/2000 | Simioni et al. |
| D423,034 S | 4/2000 | Arnette |
| D423,552 S | 4/2000 | Flanagan et al. |
| D423,553 S | 4/2000 | Brune |
| D423,554 S | 4/2000 | Conway |
| D423,556 S | 4/2000 | Conway |
| D423,557 S | 4/2000 | Conway |
| D424,094 S | 5/2000 | Conway |
| D424,095 S | 5/2000 | Brune et al. |
| D424,096 S | 5/2000 | Conway |
| D424,589 S | 5/2000 | Arnette |
| D424,598 S | 5/2000 | Simioni |
| D425,542 S | 5/2000 | Arnette |
| D425,543 S | 5/2000 | Brune |
| D426,568 S | 6/2000 | Conway |
| D427,225 S | 6/2000 | Arnette |
| D427,227 S | 6/2000 | Conway |
| 6,072,496 A | 6/2000 | Guenter et al. |
| 6,095,650 A | 8/2000 | Gao et al. |
| 6,102,539 A | 8/2000 | Tucker |
| D430,591 S | 9/2000 | Arnette |
| D432,156 S | 10/2000 | Conway et al. |
| D433,052 S | 10/2000 | Flanagan |
| 6,132,044 A | 10/2000 | Sternbergh |
| 6,139,141 A | 10/2000 | Zider |
| 6,139,143 A | 10/2000 | Brune et al. |
| 6,142,628 A | 11/2000 | Saigo |
| 6,144,388 A * | 11/2000 | Bornstein .................... 345/629 |
| D434,788 S | 12/2000 | Conway |
| D439,269 S | 3/2001 | Conway |
| 6,208,347 B1 | 3/2001 | Migdal et al. |
| 6,222,621 B1 | 4/2001 | Taguchi |
| 6,231,188 B1 | 5/2001 | Gao et al. |
| 6,233,049 B1 | 5/2001 | Kondo et al. |
| 6,246,468 B1 | 6/2001 | Dimsdale |
| 6,249,600 B1 | 6/2001 | Reed et al. |
| 6,281,903 B1 | 8/2001 | Martin et al. |
| 6,305,656 B1 | 10/2001 | Wemyss |
| 6,307,568 B1 | 10/2001 | Rom |
| 6,310,627 B1 | 10/2001 | Sakaguchi |
| 6,330,523 B1 | 12/2001 | Kacyra et al. |
| 6,356,271 B1 | 3/2002 | Reiter et al. |
| 6,377,281 B1 | 4/2002 | Rosenbluth et al. |
| 6,386,562 B1 | 5/2002 | Kuo |
| 6,415,051 B1 | 7/2002 | Callari et al. |
| 6,419,549 B2 | 7/2002 | Shirayanagi |
| 6,420,698 B1 | 7/2002 | Dimsdale |
| 6,434,278 B1 | 8/2002 | Hashimoto |
| 6,456,287 B1 | 9/2002 | Kamen et al. |
| 6,466,205 B2 | 10/2002 | Simpson et al. |
| 6,473,079 B1 | 10/2002 | Kacyra et al. |
| 6,492,986 B1 | 12/2002 | Metaxas et al. |
| 6,493,073 B2 | 12/2002 | Epstein |
| 6,508,553 B2 | 1/2003 | Gao et al. |
| 6,512,518 B2 | 1/2003 | Dimsdale |
| 6,512,993 B2 | 1/2003 | Kacyra et al. |
| 6,516,099 B1 | 2/2003 | Davison et al. |
| 6,518,963 B1 | 2/2003 | Waupotitsch et al. |
| 6,527,731 B2 | 3/2003 | Weiss et al. |
| 6,529,192 B1 | 3/2003 | Waupotitsch |
| 6,529,626 B1 | 3/2003 | Watanabe et al. |
| 6,529,627 B1 | 3/2003 | Callari et al. |
| 6,533,418 B1 | 3/2003 | Izumitani et al. |
| 6,535,223 B1 | 3/2003 | Foley |
| 6,556,196 B1 | 4/2003 | Blanz et al. |
| 6,563,499 B1 | 5/2003 | Waupotitsch et al. |
| 6,583,792 B1 | 6/2003 | Agnew |
| 6,624,843 B2 | 9/2003 | Lennon |
| 6,634,754 B2 | 10/2003 | Fukuma et al. |
| 6,637,880 B1 | 10/2003 | Yamakaji et al. |
| 6,647,146 B1 | 11/2003 | Davison et al. |
| 6,650,324 B1 | 11/2003 | Junkins |
| 6,659,609 B2 | 12/2003 | Mothes |
| 6,661,433 B1 | 12/2003 | Lee |
| 6,664,956 B1 | 12/2003 | Erdem |
| 6,668,082 B1 | 12/2003 | Davison et al. |
| 6,671,538 B1 | 12/2003 | Ehnholm et al. |
| 6,677,946 B1 | 1/2004 | Ohba |
| 6,682,195 B2 | 1/2004 | Dreher |
| 6,692,127 B2 | 2/2004 | Abitbol et al. |
| 6,705,718 B2 | 3/2004 | Fossen |
| 6,726,463 B2 | 4/2004 | Foreman |
| 6,734,849 B2 | 5/2004 | Dimsdale et al. |
| 6,736,506 B2 | 5/2004 | Izumitani et al. |
| 6,760,488 B1 | 7/2004 | Moura et al. |
| 6,775,128 B2 | 8/2004 | Leitao |
| 6,785,585 B1 | 8/2004 | Gottschald |
| 6,791,584 B1 | 9/2004 | Xie |
| 6,792,401 B1 | 9/2004 | Nigro et al. |
| 6,807,290 B2 | 10/2004 | Liu et al. |
| 6,808,381 B2 | 10/2004 | Foreman et al. |
| 6,817,713 B2 | 11/2004 | Ueno |
| 6,825,838 B2 | 11/2004 | Smith et al. |
| 6,847,383 B2 | 1/2005 | Agnew |
| 6,847,462 B1 | 1/2005 | Kacyra et al. |
| 6,876,755 B1 | 4/2005 | Taylor et al. |
| 6,893,245 B2 | 5/2005 | Foreman et al. |
| 6,903,746 B2 | 6/2005 | Fukushima et al. |
| 6,907,310 B2 | 6/2005 | Gardner et al. |
| 6,922,494 B1 | 7/2005 | Fay |
| 6,943,789 B2 | 9/2005 | Perry et al. |
| 6,944,327 B1 | 9/2005 | Soatto |
| 6,950,804 B2 | 9/2005 | Strietzel |
| 6,961,439 B2 | 11/2005 | Ballas |
| 6,965,385 B2 | 11/2005 | Welk et al. |
| 6,965,846 B2 | 11/2005 | Krimmer |
| 6,968,075 B1 | 11/2005 | Chang |
| 6,980,690 B1 | 12/2005 | Taylor et al. |
| 6,999,073 B1 | 2/2006 | Zwern et al. |
| 7,003,515 B1 | 2/2006 | Glaser et al. |
| 7,016,824 B2 | 3/2006 | Waupotitsch et al. |
| 7,034,818 B2 | 4/2006 | Perry et al. |
| 7,043,059 B2 | 5/2006 | Cheatle et al. |
| 7,051,290 B2 | 5/2006 | Foreman et al. |

(56) References Cited

U.S. PATENT DOCUMENTS

| | | |
|---|---|---|
| 7,062,722 B1 | 6/2006 | Carlin et al. |
| 7,069,107 B2 | 6/2006 | Ueno |
| 7,095,878 B1 | 8/2006 | Taylor et al. |
| 7,103,211 B1 | 9/2006 | Medioni et al. |
| 7,116,804 B2 | 10/2006 | Murase et al. |
| 7,133,048 B2 | 11/2006 | Brand |
| 7,152,976 B2 | 12/2006 | Fukuma et al. |
| 7,154,529 B2 | 12/2006 | Hoke et al. |
| 7,156,655 B2 | 1/2007 | Sachdeva et al. |
| 7,184,036 B2 | 2/2007 | Dimsdale et al. |
| 7,209,557 B2 | 4/2007 | Lahiri |
| 7,212,656 B2 | 5/2007 | Liu et al. |
| 7,212,664 B2 | 5/2007 | Lee et al. |
| 7,215,430 B2 | 5/2007 | Kacyra et al. |
| 7,218,150 B2 | 5/2007 | Kitagawa et al. |
| 7,218,323 B1 | 5/2007 | Halmshaw et al. |
| 7,219,995 B2 | 5/2007 | Ollendorf et al. |
| 7,224,357 B2 | 5/2007 | Chen et al. |
| 7,234,937 B2 | 6/2007 | Sachdeva et al. |
| 7,242,807 B2 | 7/2007 | Waupotitsch et al. |
| 7,290,201 B1 | 10/2007 | Edwards |
| 7,310,102 B2 | 12/2007 | Spicer |
| 7,324,110 B2 | 1/2008 | Edwards et al. |
| 7,415,152 B2 | 8/2008 | Jiang et al. |
| 7,421,097 B2 | 9/2008 | Hamza et al. |
| 7,426,292 B2 | 9/2008 | Moghaddam et al. |
| 7,434,931 B2 | 10/2008 | Warden et al. |
| 7,436,988 B2 | 10/2008 | Zhang et al. |
| 7,441,895 B2 | 10/2008 | Akiyama et al. |
| 7,450,737 B2 | 11/2008 | Ishikawa et al. |
| 7,489,768 B1 | 2/2009 | Strietzel |
| 7,492,364 B2 | 2/2009 | Devarajan et al. |
| 7,508,977 B2 | 3/2009 | Lyons et al. |
| 7,523,411 B2 | 4/2009 | Carlin |
| 7,530,690 B2 | 5/2009 | Divo et al. |
| 7,532,215 B2 | 5/2009 | Yoda et al. |
| 7,533,453 B2 | 5/2009 | Yancy |
| 7,540,611 B2 | 6/2009 | Welk et al. |
| 7,557,812 B2 | 7/2009 | Chou et al. |
| 7,563,975 B2 | 7/2009 | Leahy et al. |
| 7,573,475 B2 | 8/2009 | Sullivan et al. |
| 7,573,489 B2 | 8/2009 | Davidson et al. |
| 7,587,082 B1 | 9/2009 | Rudin et al. |
| 7,609,859 B2 | 10/2009 | Lee et al. |
| 7,630,580 B1 | 12/2009 | Repenning |
| 7,634,103 B2 | 12/2009 | Rubinstenn et al. |
| 7,643,685 B2 | 1/2010 | Miller |
| 7,646,909 B2 | 1/2010 | Jiang et al. |
| 7,651,221 B2 | 1/2010 | Krengel et al. |
| 7,656,402 B2 | 2/2010 | Abraham et al. |
| 7,657,083 B2 | 2/2010 | Parr et al. |
| 7,663,648 B1 | 2/2010 | Saldanha et al. |
| 7,665,843 B2 | 2/2010 | Xie |
| 7,689,043 B2 | 3/2010 | Austin et al. |
| 7,699,300 B2 | 4/2010 | Iguchi |
| 7,711,155 B1 | 5/2010 | Sharma et al. |
| 7,717,708 B2 | 5/2010 | Sachdeva et al. |
| 7,720,285 B2 | 5/2010 | Ishikawa et al. |
| D616,918 S | 6/2010 | Rohrbach |
| 7,736,147 B2 | 6/2010 | Kaza et al. |
| 7,755,619 B2 | 7/2010 | Wang et al. |
| 7,756,325 B2 | 7/2010 | Vetter et al. |
| 7,760,923 B2 | 7/2010 | Walker et al. |
| 7,768,528 B1 | 8/2010 | Edwards et al. |
| D623,216 S | 9/2010 | Rohrbach |
| 7,804,997 B2 | 9/2010 | Geng et al. |
| 7,814,436 B2 | 10/2010 | Schrag et al. |
| 7,830,384 B1 | 11/2010 | Edwards et al. |
| 7,835,565 B2 | 11/2010 | Cai et al. |
| 7,835,568 B2 | 11/2010 | Park et al. |
| 7,845,797 B2 | 12/2010 | Warden et al. |
| 7,848,548 B1 | 12/2010 | Moon et al. |
| 7,852,995 B2 | 12/2010 | Strietzel |
| 7,856,125 B2 | 12/2010 | Medioni et al. |
| 7,860,225 B2 | 12/2010 | Strietzel |
| 7,860,301 B2 | 12/2010 | Se et al. |
| 7,876,931 B2 | 1/2011 | Geng |
| 7,896,493 B2 | 3/2011 | Welk et al. |
| 7,907,774 B2 | 3/2011 | Parr et al. |
| 7,929,745 B2 | 4/2011 | Walker et al. |
| 7,929,775 B2 | 4/2011 | Hager et al. |
| 7,953,675 B2 | 5/2011 | Medioni et al. |
| 7,961,914 B1 | 6/2011 | Smith |
| 8,009,880 B2 | 8/2011 | Zhang et al. |
| 8,026,916 B2 | 9/2011 | Wen |
| 8,026,917 B1 | 9/2011 | Rogers et al. |
| 8,026,929 B2 | 9/2011 | Naimark |
| 8,031,909 B2 | 10/2011 | Se et al. |
| 8,031,933 B2 | 10/2011 | Se et al. |
| 8,059,917 B2 | 11/2011 | Dumas et al. |
| 8,064,685 B2 | 11/2011 | Solem et al. |
| 8,070,619 B2 | 12/2011 | Edwards |
| 8,073,196 B2 | 12/2011 | Yuan et al. |
| 8,090,160 B2 | 1/2012 | Kakadiaris et al. |
| 8,113,829 B2 | 2/2012 | Sachdeva et al. |
| 8,118,427 B2 | 2/2012 | Bonnin et al. |
| 8,126,242 B2 | 2/2012 | Brett et al. |
| 8,126,249 B2 | 2/2012 | Brett et al. |
| 8,126,261 B2 | 2/2012 | Medioni et al. |
| 8,130,225 B2 | 3/2012 | Sullivan et al. |
| 8,131,063 B2 | 3/2012 | Xiao et al. |
| 8,132,123 B2 | 3/2012 | Schrag et al. |
| 8,144,153 B1 | 3/2012 | Sullivan et al. |
| 8,145,545 B2 | 3/2012 | Rathod et al. |
| 8,155,411 B2 | 4/2012 | Hof et al. |
| 8,160,345 B2 | 4/2012 | Pavlovskaia et al. |
| 8,177,551 B2 | 5/2012 | Sachdeva et al. |
| 8,182,087 B2 | 5/2012 | Esser et al. |
| 8,194,072 B2 | 6/2012 | Jones et al. |
| 8,199,152 B2 | 6/2012 | Sullivan et al. |
| 8,200,502 B2 | 6/2012 | Wedwick |
| 8,204,299 B2 | 6/2012 | Arcas et al. |
| 8,204,301 B2 | 6/2012 | Xiao et al. |
| 8,204,334 B2 | 6/2012 | Bhagavathy et al. |
| 8,208,717 B2 | 6/2012 | Xiao et al. |
| 8,212,812 B2 | 7/2012 | Tsin et al. |
| 8,217,941 B2 | 7/2012 | Park et al. |
| 8,218,836 B2 | 7/2012 | Metaxas et al. |
| 8,224,039 B2 | 7/2012 | Ionita et al. |
| 8,243,065 B2 | 8/2012 | Kim |
| 8,248,417 B1 | 8/2012 | Clifton |
| 8,260,006 B1 | 9/2012 | Callari et al. |
| 8,260,038 B2 | 9/2012 | Xiao et al. |
| 8,260,039 B2 | 9/2012 | Shiell et al. |
| 8,264,504 B2 | 9/2012 | Naimark |
| 8,269,779 B2 | 9/2012 | Rogers et al. |
| 8,274,506 B1 | 9/2012 | Rees |
| 8,284,190 B2 | 10/2012 | Muktinutalapati et al. |
| 8,286,083 B2 | 10/2012 | Barrus et al. |
| 8,289,317 B2 | 10/2012 | Harvill |
| 8,290,769 B2 | 10/2012 | Taub et al. |
| 8,295,589 B2 | 10/2012 | Ofek et al. |
| 8,300,900 B2 | 10/2012 | Lai et al. |
| 8,303,113 B2 | 11/2012 | Esser et al. |
| 8,307,560 B2 | 11/2012 | Tulin |
| 8,330,801 B2 | 12/2012 | Wang et al. |
| 8,346,020 B2 | 1/2013 | Guntur |
| 8,355,079 B2 | 1/2013 | Zhang et al. |
| 8,372,319 B2 | 2/2013 | Liguori et al. |
| 8,374,422 B2 | 2/2013 | Roussel |
| 8,385,646 B2 | 2/2013 | Lang et al. |
| 8,391,547 B2 | 3/2013 | Huang et al. |
| 8,459,792 B2 | 6/2013 | Wilson et al. |
| 8,605,942 B2 | 12/2013 | Takeuchi |
| 8,605,989 B2 | 12/2013 | Rudin et al. |
| 8,743,051 B1 | 6/2014 | Moy et al. |
| 8,813,378 B2 | 8/2014 | Grove |
| 2001/0023413 A1 | 9/2001 | Fukuma et al. |
| 2001/0026272 A1 | 10/2001 | Feld et al. |
| 2001/0051517 A1 | 12/2001 | Strietzel |
| 2002/0010655 A1 | 1/2002 | Kjallstrom |
| 2002/0105530 A1 | 8/2002 | Waupotitsch et al. |
| 2002/0149585 A1 | 10/2002 | Kacyra et al. |
| 2003/0001835 A1 | 1/2003 | Dimsdale et al. |

(56) References Cited

U.S. PATENT DOCUMENTS

| | | |
|---|---|---|
| 2003/0030904 A1 | 2/2003 | Huang |
| 2003/0071810 A1 | 4/2003 | Shoov et al. |
| 2003/0110099 A1 | 6/2003 | Trajkovic et al. |
| 2003/0112240 A1 | 6/2003 | Cerny |
| 2004/0004633 A1 | 1/2004 | Perry et al. |
| 2004/0090438 A1 | 5/2004 | Alliez et al. |
| 2004/0217956 A1 | 11/2004 | Besl et al. |
| 2004/0223631 A1 | 11/2004 | Waupotitsch et al. |
| 2004/0257364 A1 | 12/2004 | Basler |
| 2005/0053275 A1 | 3/2005 | Stokes |
| 2005/0063582 A1 | 3/2005 | Park et al. |
| 2005/0111705 A1 | 5/2005 | Waupotitsch et al. |
| 2005/0128211 A1 | 6/2005 | Berger et al. |
| 2005/0162419 A1* | 7/2005 | Kim et al. .................... 345/419 |
| 2005/0190264 A1 | 9/2005 | Neal |
| 2005/0208457 A1 | 9/2005 | Fink et al. |
| 2005/0226509 A1 | 10/2005 | Maurer et al. |
| 2006/0012748 A1 | 1/2006 | Periasamy et al. |
| 2006/0017887 A1 | 1/2006 | Jacobson et al. |
| 2006/0067573 A1 | 3/2006 | Parr et al. |
| 2006/0127852 A1 | 6/2006 | Wen |
| 2006/0161474 A1 | 7/2006 | Diamond et al. |
| 2006/0212150 A1 | 9/2006 | Sims |
| 2006/0216680 A1 | 9/2006 | Buckwalter et al. |
| 2007/0013873 A9 | 1/2007 | Jacobson et al. |
| 2007/0104360 A1 | 5/2007 | Huang et al. |
| 2007/0127848 A1 | 6/2007 | Kim et al. |
| 2007/0160306 A1 | 7/2007 | Ahn et al. |
| 2007/0183679 A1 | 8/2007 | Moroto et al. |
| 2007/0233311 A1 | 10/2007 | Okada et al. |
| 2007/0262988 A1 | 11/2007 | Christensen |
| 2008/0084414 A1 | 4/2008 | Rosel et al. |
| 2008/0112610 A1 | 5/2008 | Israelsen et al. |
| 2008/0136814 A1 | 6/2008 | Chu et al. |
| 2008/0152200 A1 | 6/2008 | Medioni et al. |
| 2008/0162695 A1 | 7/2008 | Muhn et al. |
| 2008/0163344 A1 | 7/2008 | Yang |
| 2008/0170077 A1 | 7/2008 | Sullivan et al. |
| 2008/0201641 A1 | 8/2008 | Xie |
| 2008/0219589 A1 | 9/2008 | Jung et al. |
| 2008/0240588 A1 | 10/2008 | Tsoupko-Sitnikov et al. |
| 2008/0246759 A1 | 10/2008 | Summers |
| 2008/0271078 A1 | 10/2008 | Gossweiler et al. |
| 2008/0278437 A1 | 11/2008 | Barrus et al. |
| 2008/0278633 A1 | 11/2008 | Tsoupko-Sitnikov et al. |
| 2008/0279478 A1 | 11/2008 | Tsoupko-Sitnikov et al. |
| 2008/0280247 A1 | 11/2008 | Sachdeva et al. |
| 2008/0294393 A1 | 11/2008 | Laake et al. |
| 2008/0297503 A1 | 12/2008 | Dickinson et al. |
| 2008/0310757 A1 | 12/2008 | Wolberg et al. |
| 2009/0010507 A1 | 1/2009 | Geng |
| 2009/0040216 A1 | 2/2009 | Ishiyama |
| 2009/0123037 A1 | 5/2009 | Ishida |
| 2009/0129402 A1 | 5/2009 | Moller et al. |
| 2009/0132371 A1 | 5/2009 | Strietzel et al. |
| 2009/0135176 A1 | 5/2009 | Snoddy et al. |
| 2009/0135177 A1 | 5/2009 | Strietzel et al. |
| 2009/0144173 A1 | 6/2009 | Mo et al. |
| 2009/0153552 A1 | 6/2009 | Fidaleo et al. |
| 2009/0153553 A1 | 6/2009 | Kim et al. |
| 2009/0153569 A1 | 6/2009 | Park et al. |
| 2009/0154794 A1 | 6/2009 | Kim et al. |
| 2009/0184960 A1 | 7/2009 | Carr et al. |
| 2009/0185763 A1 | 7/2009 | Park et al. |
| 2009/0219281 A1 | 9/2009 | Maillot |
| 2009/0279784 A1 | 11/2009 | Arcas et al. |
| 2009/0296984 A1 | 12/2009 | Nijim et al. |
| 2009/0304270 A1 | 12/2009 | Bhagavathy et al. |
| 2009/0310861 A1 | 12/2009 | Lang et al. |
| 2009/0316945 A1 | 12/2009 | Akansu |
| 2009/0316966 A1 | 12/2009 | Marshall et al. |
| 2009/0324030 A1 | 12/2009 | Frinking et al. |
| 2009/0324121 A1 | 12/2009 | Bhagavathy et al. |
| 2010/0030578 A1 | 2/2010 | Siddique et al. |
| 2010/0134487 A1 | 6/2010 | Lai et al. |
| 2010/0138025 A1 | 6/2010 | Morton et al. |
| 2010/0141893 A1 | 6/2010 | Altheimer et al. |
| 2010/0145489 A1 | 6/2010 | Esser et al. |
| 2010/0166978 A1 | 7/2010 | Nieminen |
| 2010/0179789 A1 | 7/2010 | Sachdeva et al. |
| 2010/0191504 A1 | 7/2010 | Esser et al. |
| 2010/0198817 A1 | 8/2010 | Esser et al. |
| 2010/0209005 A1 | 8/2010 | Rudin et al. |
| 2010/0277476 A1 | 11/2010 | Johansson et al. |
| 2010/0293192 A1 | 11/2010 | Suy et al. |
| 2010/0293251 A1 | 11/2010 | Suy et al. |
| 2010/0302275 A1 | 12/2010 | Saldanha et al. |
| 2010/0329568 A1 | 12/2010 | Gamliel et al. |
| 2011/0001791 A1 | 1/2011 | Kirshenboim et al. |
| 2011/0025827 A1 | 2/2011 | Shpunt et al. |
| 2011/0026606 A1 | 2/2011 | Bhagavathy et al. |
| 2011/0026607 A1 | 2/2011 | Bhagavathy et al. |
| 2011/0029561 A1 | 2/2011 | Slaney et al. |
| 2011/0040539 A1 | 2/2011 | Szymczyk et al. |
| 2011/0043540 A1 | 2/2011 | Fancher et al. |
| 2011/0043610 A1 | 2/2011 | Ren et al. |
| 2011/0071804 A1 | 3/2011 | Xie |
| 2011/0075916 A1 | 3/2011 | Knothe et al. |
| 2011/0096832 A1 | 4/2011 | Zhang et al. |
| 2011/0102553 A1 | 5/2011 | Corcoran et al. |
| 2011/0115786 A1 | 5/2011 | Mochizuki |
| 2011/0148858 A1 | 6/2011 | Ni et al. |
| 2011/0157229 A1 | 6/2011 | Ni et al. |
| 2011/0158394 A1 | 6/2011 | Strietzel |
| 2011/0166834 A1 | 7/2011 | Clara |
| 2011/0188780 A1 | 8/2011 | Wang et al. |
| 2011/0208493 A1 | 8/2011 | Altheimer et al. |
| 2011/0211816 A1 | 9/2011 | Goedeken et al. |
| 2011/0227923 A1 | 9/2011 | Mariani et al. |
| 2011/0227934 A1 | 9/2011 | Sharp |
| 2011/0229659 A1 | 9/2011 | Reynolds |
| 2011/0229660 A1 | 9/2011 | Reynolds |
| 2011/0234581 A1 | 9/2011 | Eikelis et al. |
| 2011/0234591 A1 | 9/2011 | Mishra et al. |
| 2011/0249136 A1 | 10/2011 | Levy et al. |
| 2011/0262717 A1 | 10/2011 | Broen et al. |
| 2011/0279634 A1 | 11/2011 | Periyannan et al. |
| 2011/0292034 A1 | 12/2011 | Corazza et al. |
| 2011/0293247 A1 | 12/2011 | Bhagavathy et al. |
| 2011/0304912 A1 | 12/2011 | Broen et al. |
| 2011/0306417 A1 | 12/2011 | Sheblak et al. |
| 2012/0002161 A1 | 1/2012 | Altheimer et al. |
| 2012/0008090 A1 | 1/2012 | Atheimer et al. |
| 2012/0013608 A1 | 1/2012 | Ahn et al. |
| 2012/0016645 A1 | 1/2012 | Altheimer et al. |
| 2012/0021835 A1 | 1/2012 | Keller et al. |
| 2012/0038665 A1 | 2/2012 | Strietzel |
| 2012/0075296 A1 | 3/2012 | Wegbreit et al. |
| 2012/0079377 A1* | 3/2012 | Goossens ...................... 715/706 |
| 2012/0082432 A1 | 4/2012 | Ackley |
| 2012/0114184 A1 | 5/2012 | Barcons-Palau et al. |
| 2012/0114251 A1 | 5/2012 | Solem et al. |
| 2012/0121174 A1 | 5/2012 | Bhagavathy et al. |
| 2012/0130524 A1 | 5/2012 | Clara et al. |
| 2012/0133640 A1 | 5/2012 | Chin et al. |
| 2012/0133850 A1 | 5/2012 | Broen et al. |
| 2012/0147324 A1 | 6/2012 | Marin et al. |
| 2012/0158369 A1 | 6/2012 | Bachrach et al. |
| 2012/0162218 A1 | 6/2012 | Kim et al. |
| 2012/0166431 A1 | 6/2012 | Brewington et al. |
| 2012/0170821 A1 | 7/2012 | Zug et al. |
| 2012/0176380 A1 | 7/2012 | Wang et al. |
| 2012/0177283 A1 | 7/2012 | Wang et al. |
| 2012/0183202 A1 | 7/2012 | Wei et al. |
| 2012/0183204 A1 | 7/2012 | Aarts et al. |
| 2012/0183238 A1 | 7/2012 | Savvides et al. |
| 2012/0192401 A1 | 8/2012 | Pavlovskaia et al. |
| 2012/0206610 A1 | 8/2012 | Wang et al. |
| 2012/0219195 A1 | 8/2012 | Wu et al. |
| 2012/0224629 A1 | 9/2012 | Bhagavathy et al. |
| 2012/0229758 A1 | 9/2012 | Marin et al. |
| 2012/0256906 A1 | 10/2012 | Ross et al. |
| 2012/0263437 A1 | 10/2012 | Barcons-Palau et al. |
| 2012/0288015 A1 | 11/2012 | Zhang et al. |

(56) References Cited

U.S. PATENT DOCUMENTS

| | | |
|---|---|---|
| 2012/0294369 A1 | 11/2012 | Bhagavathy et al. |
| 2012/0294530 A1 | 11/2012 | Bhaskaranand |
| 2012/0299914 A1 | 11/2012 | Kilpatrick et al. |
| 2012/0306874 A1 | 12/2012 | Nguyen et al. |
| 2012/0307074 A1 | 12/2012 | Bhagavathy et al. |
| 2012/0314023 A1 | 12/2012 | Barcons-Palau et al. |
| 2012/0320153 A1 | 12/2012 | Barcons-Palau et al. |
| 2012/0321128 A1 | 12/2012 | Medioni et al. |
| 2012/0323581 A1 | 12/2012 | Strietzel et al. |
| 2013/0027657 A1 | 1/2013 | Esser et al. |
| 2013/0070973 A1 | 3/2013 | Saito et al. |
| 2013/0088490 A1 | 4/2013 | Rasmussen et al. |
| 2013/0187915 A1 | 7/2013 | Lee et al. |
| 2013/0201187 A1 | 8/2013 | Tong et al. |
| 2013/0271451 A1 | 10/2013 | Tong et al. |

FOREIGN PATENT DOCUMENTS

| | | |
|---|---|---|
| EP | 0359596 A1 | 3/1990 |
| EP | 0994336 A2 | 4/2000 |
| EP | 1011006 A1 | 6/2000 |
| EP | 1136869 A1 | 9/2001 |
| EP | 1138253 A2 | 10/2001 |
| EP | 0444902 B2 | 6/2002 |
| EP | 1450201 A1 | 8/2004 |
| EP | 1728467 A1 | 12/2006 |
| EP | 1154302 B1 | 8/2009 |
| FR | 2966038 A1 | 4/2012 |
| GB | 2449855 A | 12/2008 |
| JP | 2003345857 A | 12/2003 |
| JP | 2004272530 A | 9/2004 |
| JP | 2005269022 A | 9/2005 |
| KR | 20000028583 A | 5/2000 |
| KR | 200000051217 A | 8/2000 |
| KR | 20040097200 A | 11/2004 |
| KR | 20080086945 A | 9/2008 |
| KR | 20100050052 A | 5/2010 |
| WO | WO 9300641 A1 | 1/1993 |
| WO | WO 9604596 A1 | 2/1996 |
| WO | WO 9740342 A2 | 10/1997 |
| WO | WO 9740960 A1 | 11/1997 |
| WO | WO 9813721 A1 | 4/1998 |
| WO | WO 9827861 A1 | 7/1998 |
| WO | WO 9827902 A2 | 7/1998 |
| WO | WO 9835263 A1 | 8/1998 |
| WO | WO 9852189 A2 | 11/1998 |
| WO | WO 9857270 A1 | 12/1998 |
| WO | WO 9956942 A1 | 11/1999 |
| WO | WO 9964918 A1 | 12/1999 |
| WO | WO 0000863 A1 | 1/2000 |
| WO | WO 0016683 A1 | 3/2000 |
| WO | WO 0045348 A1 | 8/2000 |
| WO | WO 0049919 A1 | 8/2000 |
| WO | WO 0062148 A1 | 10/2000 |
| WO | WO 0064168 A1 | 10/2000 |
| WO | WO 0123908 A1 | 4/2001 |
| WO | WO 0132074 A1 | 5/2001 |
| WO | WO 0135338 A1 | 5/2001 |
| WO | WO 0161447 A1 | 8/2001 |
| WO | WO 0167325 A1 | 9/2001 |
| WO | WO 0174553 A2 | 10/2001 |
| WO | WO 0178630 A1 | 10/2001 |
| WO | WO 0188654 A2 | 11/2001 |
| WO | WO 0207845 A1 | 1/2002 |
| WO | WO 0241127 A2 | 5/2002 |
| WO | WO 03079097 A1 | 9/2003 |
| WO | WO 03084448 A1 | 10/2003 |
| WO | WO 2007012261 A1 | 2/2007 |
| WO | WO 2007017751 A1 | 2/2007 |
| WO | WO 2007018017 A1 | 2/2007 |
| WO | WO 2008009355 A1 | 1/2008 |
| WO | WO 2008009423 A1 | 1/2008 |
| WO | WO 2008135178 A1 | 11/2008 |
| WO | WO 2009023012 A1 | 2/2009 |
| WO | WO 2009043941 A1 | 4/2009 |
| WO | 2010039976 A1 | 4/2010 |
| WO | 2010042990 A1 | 4/2010 |
| WO | WO 2011012743 A2 | 2/2011 |
| WO | WO 2011095917 A1 | 8/2011 |
| WO | WO 2011134611 A1 | 11/2011 |
| WO | WO 2011147649 A1 | 12/2011 |
| WO | WO 2012051654 A1 | 4/2012 |
| WO | WO 2012054972 A1 | 5/2012 |
| WO | WO 2012054983 A1 | 5/2012 |

OTHER PUBLICATIONS

PCT International Search Report for PCT International Patent Application No. PCT/US2013/042525, mailed Sep. 17, 2013.
PCT International Search Report for PCT International Patent Application No. PCT/US2013/042520, mailed Sep. 17, 2013.
PCT International Search Report for PCT International Patent Application No. PCT/US2013/042504, mailed Aug. 19, 2013.
PCT International Search Report for PCT International Patent Application No. PCT/US2013/042509, mailed Sep. 2, 2013.
PCT International Search Report for PCT International Patent Application No. PCT/US2013/042514, mailed Aug. 30, 2013.
PCT International Search Report for PCT International Patent Application No. PCT/US2013/042517, mailed Aug. 29, 2013.
PCT International Search Report for PCT International Patent Application No. PCT/US2012/068174, mailed Mar. 7, 2013.
3D Morphable Model Face Animation, http://www.youtube.com/watch?v=niceNYb_WA, Apr. 20, 2006.
Visionix 3D iView, Human Body Measurement Newsletter, vol. 1., No. 2, Sep. 2005, pp. 2 and 3.
Blaise Aguera y Areas demos Photosynth, May 2007. Ted.com, http://www.ted.com/talks/blaise_aguera_y_arcas_demos_photosynth.html.
ERC Tecnology Leads to Eyeglass "Virtual Try-on" System, Apr. 20, 2012, http://showcase.erc-assoc.org/accomplishments/microelectronic/imsc6-eyeglass.htm.
Information about Related Patents and Patent Applications, see the section below having the same title.
U.S. Appl. No. 13/775,785, filed Feb. 25, 2013, Systems and Methods for Adjusting a Virtual Try-On.
U.S. Appl. No. 13/775,764, filed Feb. 25, 2013, Systems and Methods for Feature Tracking.
U.S. Appl. No. 13/774,995, filed Feb. 22, 2013, Systems and Methods for Scaling a Three-Dimensional Model.
U.S. Appl. No. 13/774,985, filed Feb. 22, 2013, Systems and Methods for Generating a 3-D Model of a Virtual Try-On Product.
U.S. Appl. No. 13/774,983, filed Feb. 22, 2013, Systems and Methods for Generating a 3-D Model of a User for a Virtual Try-On Product.
U.S. Appl. No. 13/774,978, filed Feb. 22, 2013, Systems and Methods for Efficiently Processing Virtual 3-D Data.
U.S. Appl. No. 13/774,958, filed Feb. 22, 2013, Systems and Methods for Rendering Virtual Try-On Products.
U.S. Appl. No. 13/706,909, filed Dec. 6, 2012, Systems and Methods for Obtaining a Pupillary Distance Measurement Using a Mobile Computing Device.
Dror et al., Recognition of Surface Relfectance Properties form a Single Image under Unknown Real-World Illumination, IEEE, Proceedings of the IEEE Workshop on Identifying Objects Across Variations in Lighting: Psychophysics & Computation, Dec. 2011.
Sinha et al., GPU-based Video Feautre Tracking and Matching, http:frahm.web.unc.edu/files/2014101/GPU-based-Video-Feature-Tracking-And Matching.pdf, May 2006.
Tracker, Tracker Help, Nov. 2009.
Simonite, 3-D Models Created by a Cell Phone, Mar. 23, 2011, url: http://www.technologyreview.com/news/42338613-d-models-created-by-a-cell-phone/.
Fidaleo, Model-Assisted 3D Face Reconstruction from Video, AMFG'07 Analysis and Modeling of Faces and Gestures Lecture Notes in Computer Science vol. 4778, 2007, pp. 124-138.
Garcia-Mateos, Estimating 3D facial pose in video with just three points, CVPRW '08 Computer vision and Pattern Recognition Workshops, 2008.

* cited by examiner

SYSTEMS AND METHODS FOR ADJUSTING A VIRTUAL TRY-ON

RELATED APPLICATIONS

This application claims priority to U.S. Provisional Application No. 61/650,983, entitled SYSTEMS AND METHODS TO VIRTUALLY TRY-ON PRODUCTS, filed on May 23, 2012; and U.S. Provisional Application No. 61/735,951, entitled SYSTEMS AND METHODS TO VIRTUALLY TRY-ON PRODUCTS, filed on Dec. 11, 2012, which is incorporated herein in their entirety by this reference.

BACKGROUND

The use of computer systems and computer-related technologies continues to increase at a rapid pace. This increased use of computer systems has influenced the advances made to computer-related technologies. Indeed, computer devices have increasingly become an integral part of the business world and the activities of individual consumers. Computing devices may be used to carry out several business, industry, and academic endeavors.

In various situations, advances in technology may allow activities that could only be done in person to be done virtually (e.g., online). For example, online shopping has enabled customers to be able to browse huge inventories of products without leaving the comfort of their own home. While the online shopping experience has allowed customers to seamlessly compare, analyze, and purchase certain products, purchasing clothing and other types of personal (e.g. personalized) accessories presents additional challenges. Typical brick and mortar clothing and accessory stores provide dressing rooms, mirrors, and other services to help the customer select items to purchase. It may be desirable to bring these types of services to the online shopping experience.

SUMMARY

According to at least one embodiment, a computer-implemented method for generating a virtual try-on is described. A first model is obtained. The first model includes a first set of attachment points. A second model is obtained. The second model includes a first set of connection points. The first model and the second model are combined. Combining the first and second models includes matching the first set of attachment points with the first set of connection points. An image is rendered based on at least a portion of the combined first and second models.

In one embodiment, an adjustment command may be received. In some cases, the combined first and second models may be adjusted based on the adjustment command.

In one example, the first model may additionally include a second set of attachment points. In this example, the combined first and second models may be adjusted by matching the second set of attachment points with the first set of connection points. In another example, the second model may additionally include a second set of connection points. In this example, the combined first and second models may be adjusted by matching the first set of attachment points with the second set of connection points. In yet another example, the first model may additionally include a second set of attachment points and the second model may additionally include a second set of connection points. In this example, the combined first and second models may be adjusted by matching the second set of attachment points with the second set of connection points.

In some cases, receiving the adjustment command may include receiving a touch input. In one example, the first model may be a three-dimensional model of a user. In one instance, the three-dimensional model of the user may be a morphable model. In one example, the first set of attachment points may include a noise point and at least one ear point.

In one example, the second model may be a three-dimensional model of glasses. In some cases, the first set of connection points may include a nose connection point and at least one earpiece connection point. In one embodiment, the combined first and second models may be a modeled virtual try-on.

A computing device configured to generate a virtual try-on is also described. The computing device includes a processor and memory in electronic communication with the processor. The computing device further includes instructions stored in the memory, the instructions being executable by the processor to obtain a first model, the first model comprising a first set of attachment points, obtain a second model, the second model comprising a first set of connection points, combine the first model and the second model, and render an image based on at least a portion of the combined first and second models. Combining the first and second models includes instructions executable by the processor to match the first set of attachment points with the first set of connection points.

A computer-program product to generate a virtual try-on is additionally described. The computer-program product may include a non-transitory computer-readable medium that stores instructions. The instructions may be executable by a processor to obtain a first model, the first model comprising a first set of attachment points, obtain a second model, the second model comprising a first set of connection points, combine the first model and the second model, and render an image based on at least a portion of the combined first and second models. Combining the first and second models includes instructions executable by the processor to match the first set of attachment points with the first set of connection points.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a diagram illustrating one example of a modeled try-on;

FIG. 11 is a diagram illustrating an example of a modeled try-on;

FIG. 12 is a diagram illustrating an example of a rendering box for rendering a portion of a modeled try-on;

FIG. 23 is a flow diagram illustrating one example of a method to generate a virtual try-on;

FIG. 24 is a flow diagram illustrating one example of a method to adjust a virtual try-on.

Figure 1:
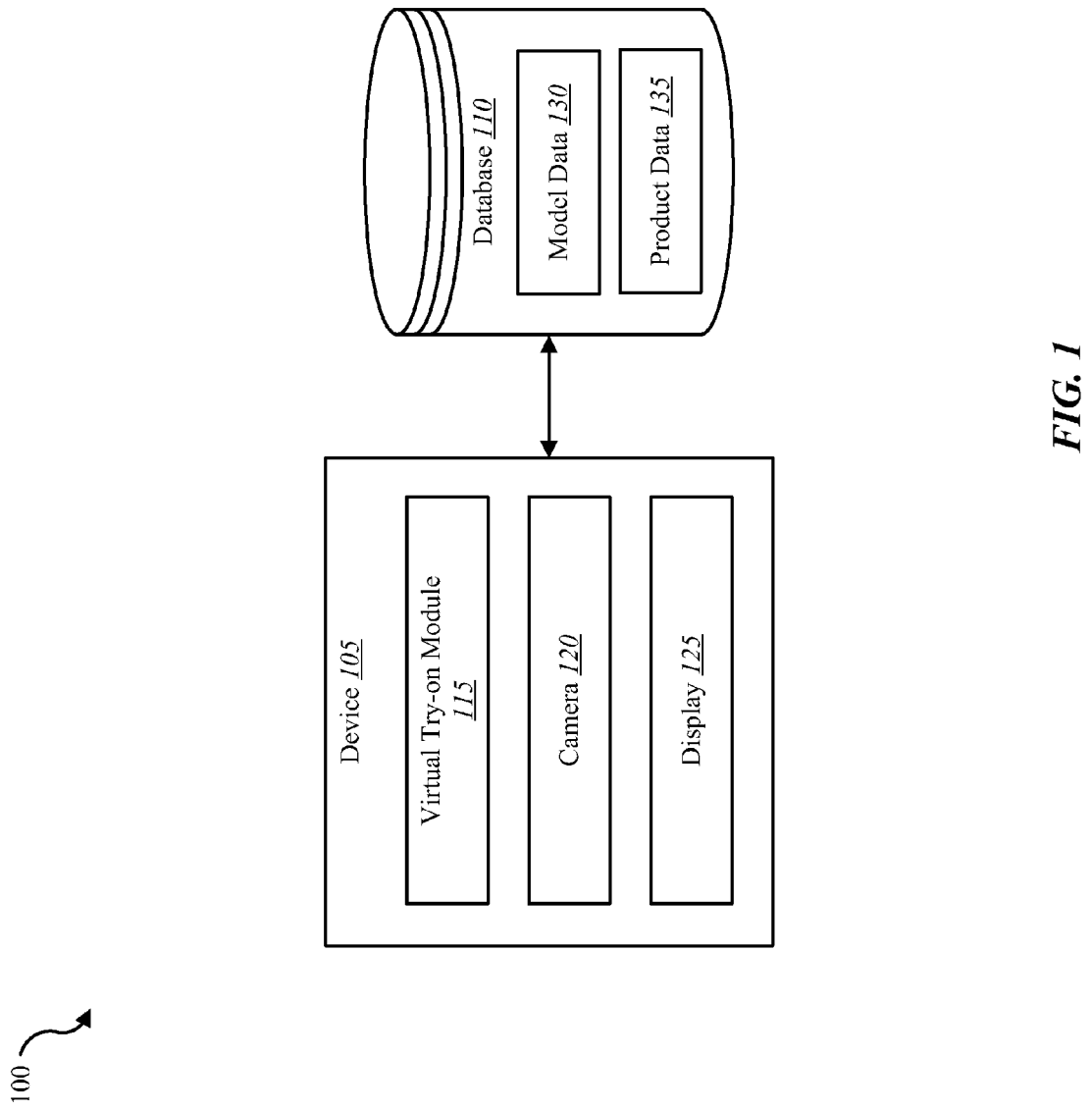
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Different users may wear/use the same item differently. For example, some users may prefer that a pair of glasses sits close to their face (towards the base of their nose), while other users may prefer that a pair of glasses sits away from their face (towards the tip of their nose). Furthermore, some users may prefer that a pair of glasses sit so that that the temples (e.g., arms) slide horizontally by the ears, while other users may prefer that the temples are angled so that the temples sit above the ears. Naturally, there may be an infinite number of ways that a user may prefer to wear a pair of glasses (or any other product). Therefore, it may be desirable to allow a user to manipulate or otherwise adjust the way a user virtually tries-on a pair of glasses (or any other product).

In some cases, a virtual try-on may be generated by modeling the virtual try-on in a three-dimensional space and then rendering one or more images based on the modeled virtual try-on. In one example, the modeled virtual try-on may be generated by interfacing a three-dimensional model of a user with a three-dimensional model of a product. For instance, a three-dimensional model of a user's face/head and a three-dimensional model of a pair of glasses may be interfaced together to generate a modeled virtual try-on of a user trying-on a pair of glasses. This modeled virtual try-on may then be used to render one or more images of the user virtually trying-on the pair of glasses. Although the example, of a user virtually trying-on a pair of glasses is used hereafter, it is understood, that a user may virtually try-on any product using the systems and methods described herein.

The positioning of the glasses in the virtual try-on may be determined based on the way the three-dimensional model of the pair of glasses is interfaced (e.g., positioned) with respect to the three-dimensional model of the user's face/head in the modeled virtual try-on. For example, if the modeled virtual try-on interfaces the three-dimensional model of the glasses with the three-dimensional model of the user's face/head so that the glasses sit towards the tip of the nose, then the one or more images rendered based on the modeled virtual try-on may illustrate the virtually tried-on in a position where the glasses sit towards the tip of the nose. Therefore, adjusting the way that the three-dimensional model of the glasses and the three-dimensional model of the user's face/head are interfaced in the modeled virtual try-on may adjust the way that the one or more images render the virtual try-on.

In some cases, a user may adjust a virtual try-on through a user interface. For example, a user may use an input command (e.g., touch commands, sliders, etc.) to adjust the positioning of the virtually tried-on glasses. In some cases, the modeled virtual try-on is adjusted (one or more of the three-dimensional model of the glasses and the three-dimensional model of the user's face/head is repositioned, for example) based on the input command. At least a portion of the modeled virtual try-on may be used to render one or more images of the adjusted virtual try-on.

Turning now to the figures, FIG. 1 is a block diagram illustrating one embodiment of an environment 100 in which the present systems and methods may be implemented. In some embodiments, the systems and methods described herein may be performed on a single device (e.g., device 105). For example, the systems and method described herein may be performed by a virtual try-on module 115 that is located on the device 105. Examples of device 105 include mobile devices, smart phones, personal computing devices, computers, servers, etc.

In one embodiment, a device 105 may include the virtual try-on module 115, a camera 120, and a display 125. In one example, the device 105 may be coupled to a database 110. The database 110 may be internal to the device 105. Additionally or alternatively, the database 110 may be external to the device 105. The database 110 may include model data 130 and/or product data 135.

In one example, the virtual try-on module 115 may enable a user to virtually try-on a pair of glasses in a preferred position. The virtual try-on module 115 may obtain a three-dimensional model of a user (based on the model data 130, for example). The three-dimensional model of the user may include one or more sets of attachment points. In one example, each set of attachment points may correspond to a different position in which the glasses may be worn. The virtual try-on module 115 may also obtain a three-dimensional model of a pair of glasses (based on the product data 135, for example). The three-dimensional model of the glasses may include one or more sets of connection points. In one example, each set of connection points may correspond to the points of connection when the glasses are worn in a particular position. In another example, each set of connection points may correspond to a different way that the glasses may be adjusted to fit a user's head.

An initial position may be selected. In one example, the initial position may be determined based on stored (in database 110, for example) position information. In one example, the position information may correspond to a default initial position. In another example, the position information may correspond to a preselected position. The virtual try-on module 115 may generate a modeled try-on by combining the three-dimensional model of the user and the three-dimensional model of the glasses. In some cases, combining the three-dimensional model of the user and the three-dimensional model of the glasses includes matching the selected connection points with the selected attachment points. As noted previously, the position of the three-dimensional model of the glasses in the modeled try-on may be based on the set of attachment points used to attach the three-dimensional model of the glasses to the three-dimensional model of the glasses.

The virtual try-on module 115 may provide a virtual try-on experience by rendering one or more images of a virtual try-on based on at least a portion of the modeled try-on. In some cases, the one or more rendered images may be displayed via the display 125.

Additionally or alternatively, the virtual try-on module 115 may enable a user to adjust the position of a virtually tried-on pair of glasses (during the virtual try-on experience, for example). In one example, a modeled try-on may include the three-dimensional model of the user and the three-dimensional model of the glasses matched with a first set of attachment points being matched with a first set of connection points. The virtual try-on module 115 may receive adjustment information (a touch input, for example) indicating that the position of the glasses and/or the way the glasses are worn on the face should be adjusted. In this example, the virtual try-on module 115 may adjust the position of the glasses and/or the way the glasses are worn based on the adjustment information. In one example, a second set of attachment points and/or a second set of connection points may be selected based on the adjustment information. The virtual try-on module 115 may then generate an adjusted modeled try-on by combining the three-dimensional model of the user and the three-dimensional model of the glasses with the selected set of attachment points matched with the selected set of connection points. The virtual try-on module 115 may then render one or more images of a virtual try-on based on at least a portion of the adjusted modeled try-on.

In some cases, the three-dimensional model (e.g., morphable model) of the user may be obtained (e.g., received, generated, etc.) based on the model data 130. In one example, the model data 130 may include a three-dimensional model for the user. In another example, the model data 130 may include morphable model information. For instance, the model data 130 may include morphable model information. The morphable model information may include one or more average models (e.g., caricatures) that may be combined (in a linear combination, for example) based on a set of coefficients (corresponding to the user) to produce a morphable model of the user. In various situations, the three-dimensional model of the user may be generated based on one or more images of a user that were captured via the camera 120.

In some cases, the three dimensional model of the glasses (e.g., a pair of glasses) may be obtained (e.g., received, generated, etc.) based on the product data 135. In one example, the product data 135 may include one or more three-dimensional models of glasses and/or product information for generating one or more three-dimensional models of glasses. The three-dimensional model of the user and the three-dimensional model of the glasses may each be scaled models (that are scaled based on the same scaling standard, for example).

Figure 2:
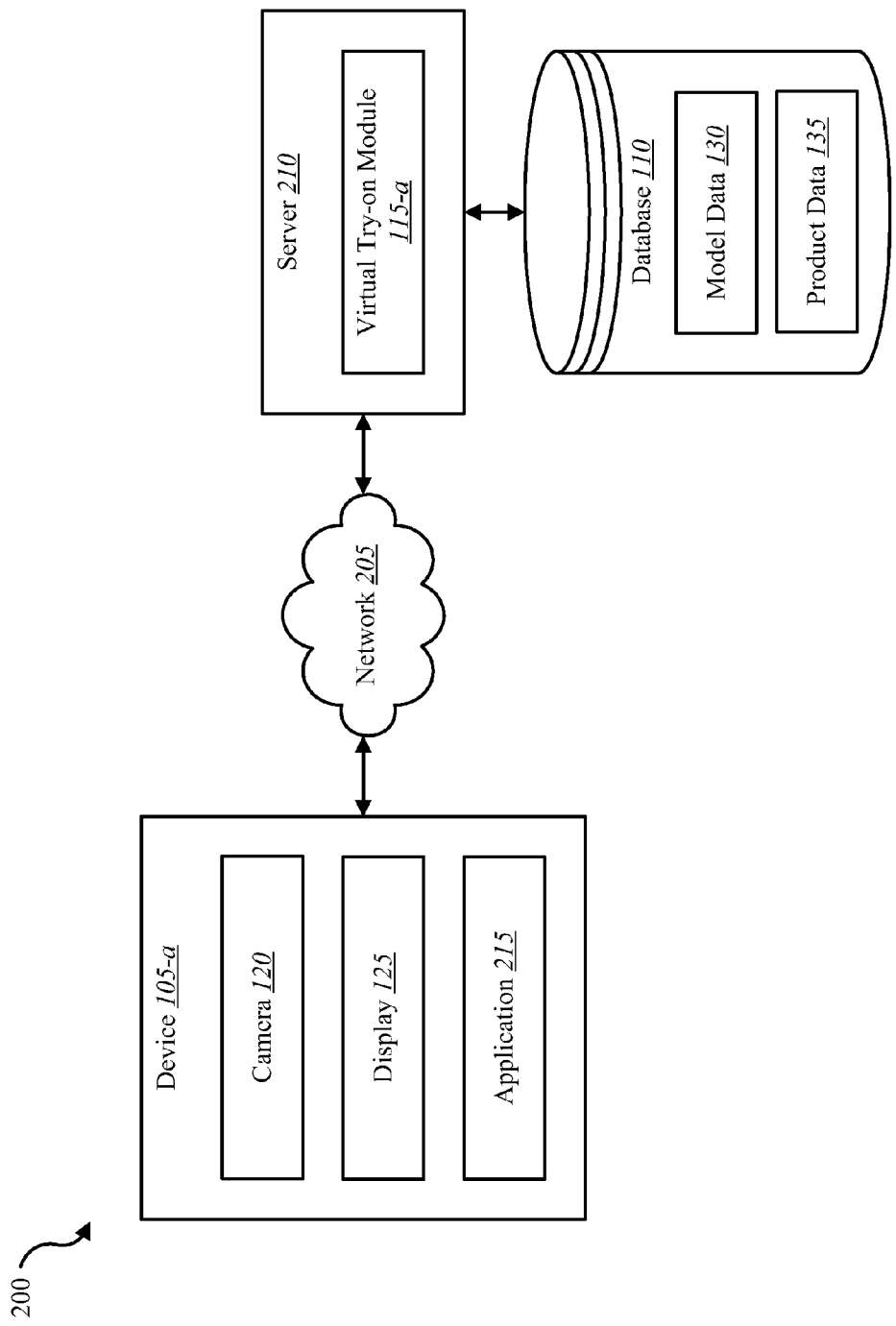
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 105-*a* may communicate with a server 210 via a network 205. Examples of networks 205 include local area networks (LAN), wide area networks (WAN), virtual private networks (VPN), cellular networks (using 3G and/or LTE, for example), etc. In some configurations, the network 205 may be the internet. In some configurations, the device 105-*a* may be one example of the device 105 illustrated in FIG. 1. For example, the device 105-*a* may include the camera 120, the display 125, and an application 215. It is noted that in some embodiments, the device 105-*a* may not include a virtual try-on module 115.

In some embodiments, the server 210 may include a virtual try-on module 115-*a*. The virtual try-on module 115-*a* may be one example of the virtual try-on module 115 illustrated in FIG. 1. In one embodiment, the server 210 may be coupled to the database 110. For example, the virtual try-on module 115-*a* may access the model data 130 in the database 110 via the server 210. The database 110 may be internal or external to the server 210.

In some configurations, the application 215 may capture one or more images via the camera 120. For example, the application 215 may use the camera 120 to capture one or more images of a user. In one example, the application 215 may transmit the captured one or more images to the server 210 (for processing and analysis, for example). In another example, the application 215 may process and/or analyze the one or more images and then transmit information (e.g., a selected set of images, set of coefficients, model data, etc.) to the server 210.

In some configurations, the virtual try-on module 115-*a* may obtain the one or more images and/or the information and may generate a modeled try-on based on the one or more images and/or the information as described above and as will be described in further detail below. In one example, the virtual try-on module 115-*a* may transmit one or more rendered images (based on a modeled try-on) to the application 215. In some configurations, the application 215 may obtain the one or more rendered images and may output one or more images of a virtual try-on to be displayed via the display 125.

Figure 3:
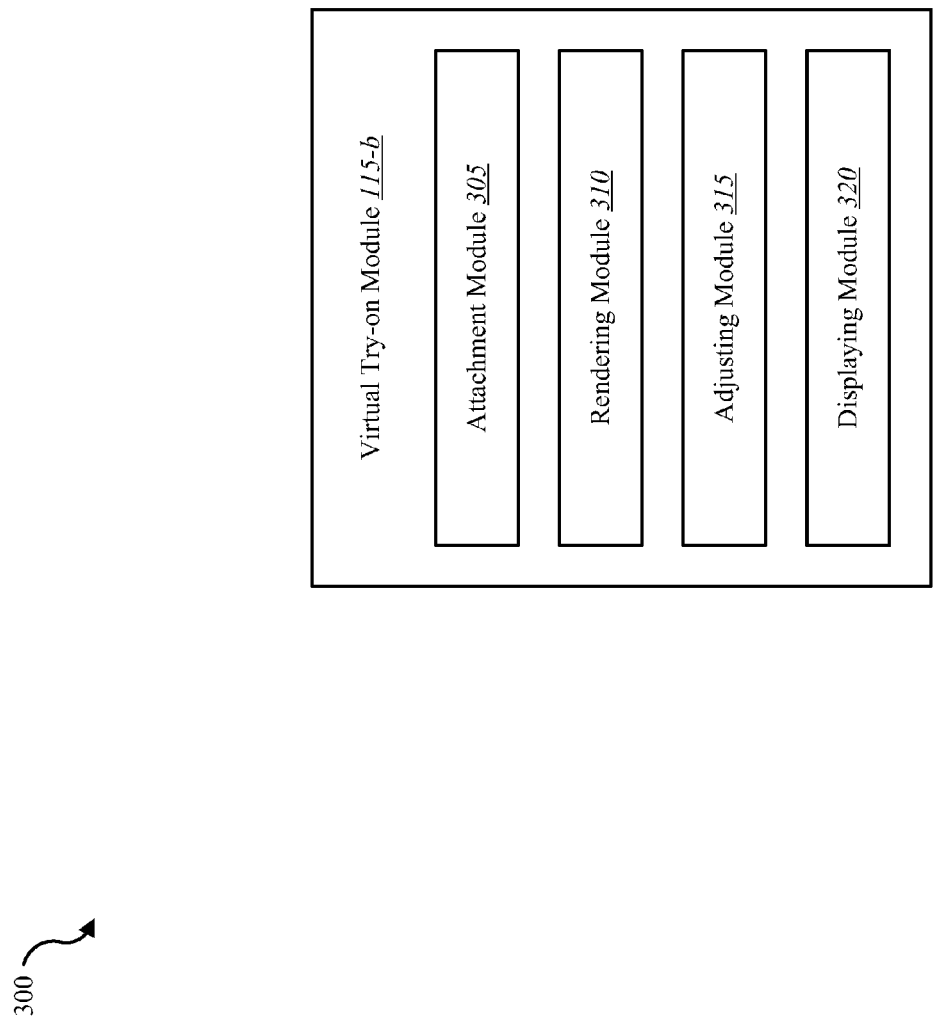
FIG. 3 is a block diagram illustrating one example of a virtual try-on module.

FIG. 3 is a block diagram 300 illustrating one example of a virtual try-on module 115-*b*. The virtual try-on module 115-*b* may be one example of the virtual try-on modules 115 illustrated in FIG. 1 or 2. The virtual try-on module 115-*b* may include an attachment module 305, a rendering module 310, an adjustment module 315, and a displaying module 320.

In one embodiment, the attachment module 305 may combine a three-dimensional model of a user and a three-dimensional model of glasses by matching a set attachment points on the three-dimensional model of the user with a set of connection points on the three-dimensional model of the glasses. The set of attachment points and/or the set of connection points may be selected based on a default position, a pre-selected position, and/or adjustment information. In one example, combining the three-dimensional model of the user and the three-dimensional model of the glasses generates a modeled try-on. Details regarding the attachment module 305 are described below.

In one embodiment, the rendering module 310 may render one or more images for a virtual try-on based on the modeled try-on. In one example, the modeled try-on may be a pixel depth map that represents the geometry and the color, texture, etc., associated with each three-dimensional model. In this example, one or more images may be rendered by determining (and capturing) the visible pixels corresponding to a particular point of view of the modeled try-on. In some cases, the rendering may be limited to the addition of the three-dimensional model of the glasses and the addition of the interactions (e.g., shadows, reflections, etc.) between the three-dimensional model of the glasses and the three-dimensional model of the user. This may allow one or more rendering images to be overlaid onto one or more images of the user to create the virtual try-on experience. Since the three-dimensional model of the glasses and the interactions as a result of the addition of the three-dimensional model of the glasses may affect only a portion of the modeled try-on, the rendering module 310 may limit the rendering to a portion of the modeled try-on. For example, the rendering may be limited to the portion corresponding to the three-dimensional model of the glasses and interactions (e.g., shadows, reflections, etc.) between the three-dimensional model of the glasses and the three-dimensional model of the user. In one scenario, a three-dimensional rendering box may be the portion of the modeled try-on that is rendered. An example of a three-dimensional rendering box is described below.

In one embodiment, the adjusting module 315 may receive an input (touch input, for example) indicating a request to adjust the position of the glasses. Upon receiving the adjustment request, the adjusting module 315 may determine whether the requested adjustment corresponds to a possible position. Upon determining that the requested adjustment corresponds to a possible position, the adjusting module 315 may provide the adjustment request to the attachment module 305. The attachment module 305 may select a set of attachment points and/or a set of connection points that corresponds to the requested adjustment and may generate an adjusted modeled try-on as described previously. The rendering module 310 may then render one or more images based on the updated modeled try-on.

In one embodiment, the display module 320 may display the rendered one or more images (via the display 125, for example). In one example, the display module 320 may display a frontal view of a virtual try-on and/or a profile view of the virtual try-on. Examples of the displayed frontal view and displayed profile view are described below. In some cases, the display module 320 may receive touch inputs (e.g., swipes, drags, selections, etc.) via the display 125. In some cases, the display module 320 may determine if the touch input is received with respect to the frontal view and/or if the touch input is received with respect to the profile view. In one example, a vertical swipe in the frontal view slides the glasses to a various positions up or down the nose and a vertical swipe in the profile view tips the glasses to various positions. Examples are shown below.

Figure 4:
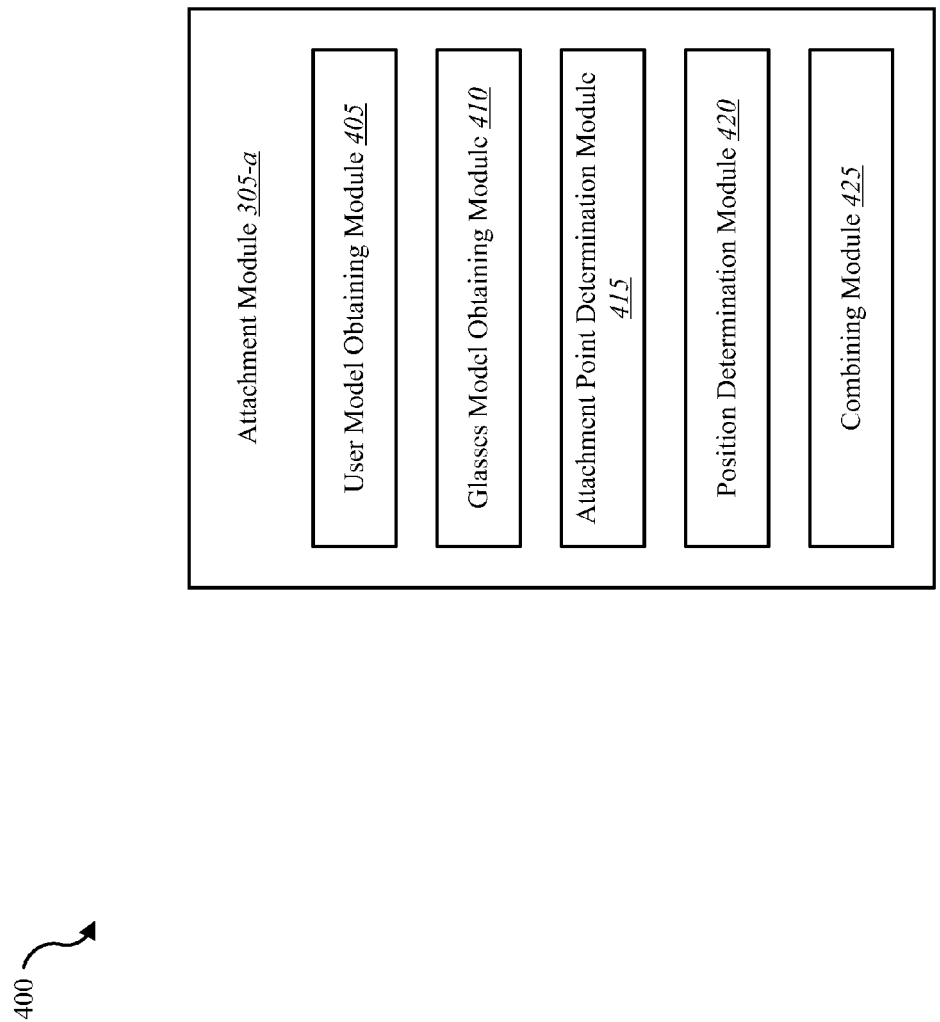
FIG. 4 is a block diagram illustrating one example, of an attachment module.

FIG. 4 is a block diagram 400 illustrating one example, of an attachment module 305-a. The attachment module 305-a may be one example of the attachment module 305 illustrated in FIG. 3. In one embodiment, the attachment module 305-a may include a user model obtaining module 405, a glasses model obtaining module 410, an attachment point determination module 415, a position determination module 420, and a combining module 425.

The user model obtaining module 405 may obtain a three-dimensional model (e.g., morphable model) of a user based on the model data 130. The glasses model obtaining module 410 may obtain a three-dimensional model of a pair of glasses based on the product data 135.

The attachment point determination module 415 may identify one or more sets of attachment points on the three-dimensional model of the user. The attachment point determination module 415 may also identify one or more sets of connection points on the three-dimensional model of the glasses.

The position determination module 420 may determine a position to be used when generating the modeled try-on. In some cases, the determined position may correspond to a default position. In one example, the default position may correspond to a set of attachment points that are used by a majority of users when wearing glasses (the position that a majority of users prefer, for example). In the case that the user has previously adjusted the glasses to a custom position (e.g., pre-selected position), the attachment points corresponding to the custom position may be used as the determined position. In some cases, the position determination module 420 may determine a position based on a current position (e.g., the default position or a preselected position) and received adjustment information. In one example, the position determination module 420 may select a set of attachment points (e.g., a position) corresponding to the adjusted position. In some cases, the selected set of attachment points may be saved as the preselected position. In the case that the glasses are adjusted with respect to the face (in the same position, for example) then the position determination module 420 may determine the set of connection points that should be connected to the corresponding set of attachment points. As described with respect the default position, preselected position, and adjusted position (e.g., new preselected position), a set of connection points may correspond to a default set of connection points, a preselected set of attachment points, and an adjusted set of attachment points (e.g., a new set of preselected connection points).

The combining module 425 may combine the three-dimensional model of the user with the three-dimensional model of the glasses by matching the selected set of connection points with the selected set of attachment points. As a result, the combining module 425 may generate a modeled virtual try-on that positions the glasses in a consistent position and/or allows the position of the glasses to be adjusted based on a user's preference. The boundaries (e.g., surfaces) of the three-dimensional model of the user and the three-dimensional model of the glasses are defined and enforced. As a result, the combination of the three-dimensional model of the user and the three-dimensional model of the glasses is a non-interfering combination (there is no interference into the boundaries of the models, for example).

Figure 5:
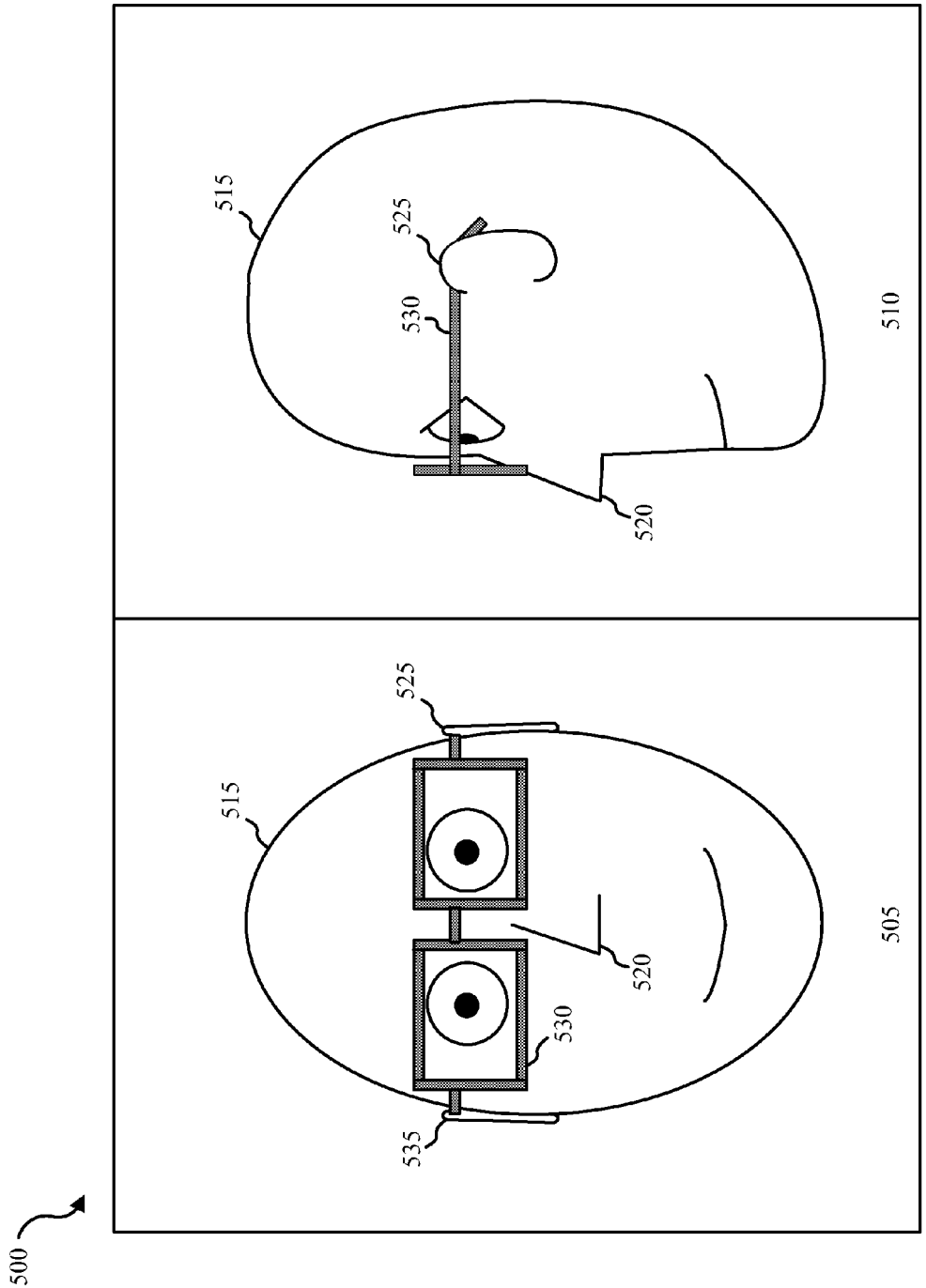

FIG. 5 is a diagram 500 illustrating one example of a modeled try-on. The modeled try-on may include the three-dimensional model of the user 515 and the three-dimensional model of the glasses 530. In one example, the three-dimensional model of the user 515 may include a nose 520, a right ear 535, and a left ear 525. In some configurations, the three-dimensional model of the glasses 530 may be positioned on the face of the three-dimensional model of the user 515 so that the three-dimensional model of the glasses 530 attaches to the nose 520 and regions around the left ear 525 and the right ear 535. In one example, the modeled try-on, which is a three-dimensional model (a three-dimensional depth map, for example), may be illustrated in a frontal view 505 and a profile view 510. Although the following examples utilize a frontal view 505 and a profile view 510 of the three-dimensional model of the user 515, it is understood, that various other angles (e.g., perspectives) may be used.

Figure 6:
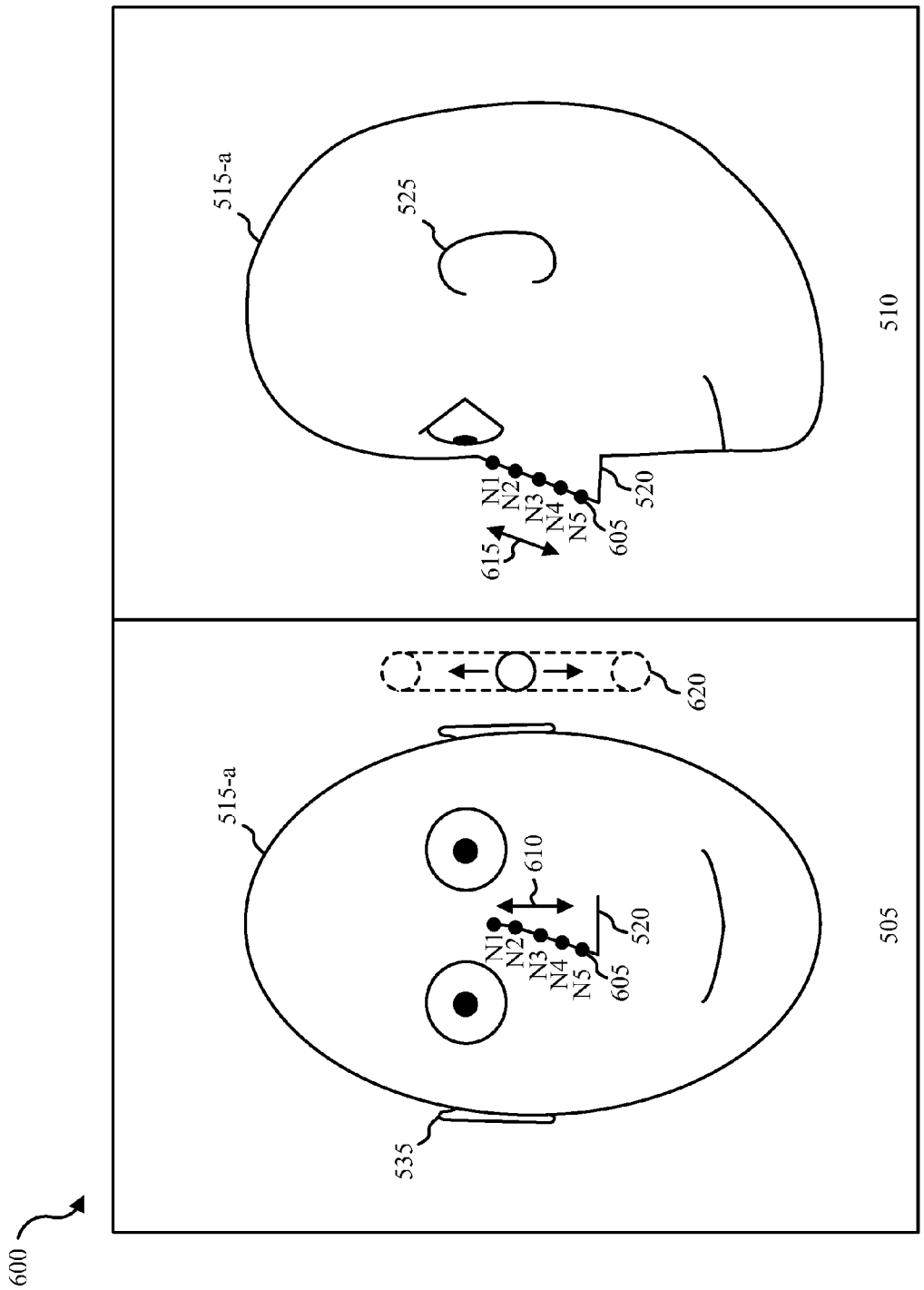
FIG. 6 is a diagram illustrating one example of attachment points on the three-dimensional model of the user.

FIG. 6 is a diagram 600 illustrating one example of attachment points on the three-dimensional model of the user 515-a. The three-dimensional model of the user 515-a may be an example of the three-dimensional model of the user 515 illustrated in FIG. 5. In one example, the three-dimensional model of the user 515-a may include a plurality of nose points (e.g., attachment points) 605 along the nose 520. Although, five nose points 605 are shown (e.g., N1, N2, N3, N4, N5) in the present example, it is understood, that more or less nose points 605 may be used.

As noted previously, the three-dimensional model of the user 515-a may be a morphable model 515-a. In one example, the plurality of nose points 605 may correspond to particular points on the morphable model 515-a. As a result of being tied to specific points on the morphable model 515-a, each nose point 605 may correspond to the same point on the morphable model 515-a regardless of the shape or size of the user's face. For instance, if the user has a larger nose 520, then the nose points 605 will be spread further apart and if the user has a smaller nose 520, then the nose points 605 may be squished closer together. As a result, the nose point N1 605 on a larger nose 520 may correspond to nose point N1 605 on a smaller nose 520.

In one example, a touch sensor 620 may be associated with the frontal view 505. The touch sensor 620 may be used to adjust which nose point 605 the three-dimensional model of the glasses should be positioned at. In one example, a user may slide a three-dimensional model of the glasses up/down 610 and in/out 615 along the nose by swiping or dragging a finger up/down on the touch sensor 620. In one example, the default nose point 605 may correspond to nose point N2 605. In this example, sliding the touch sensor 620 up may select a nose point 605 up the nose 520 (nose point N1 605, for example) and sliding the touch sensor 620 down may select a nose point 605 down the nose 520 (nose point N3 605, for example). It is noted that although the nose points 605 appear to go vertically up/down 610 as illustrated in frontal view 505, the nose points 605 actually go up and in/down and out 615 as illustrated in the profile view 510.

Figure 7:
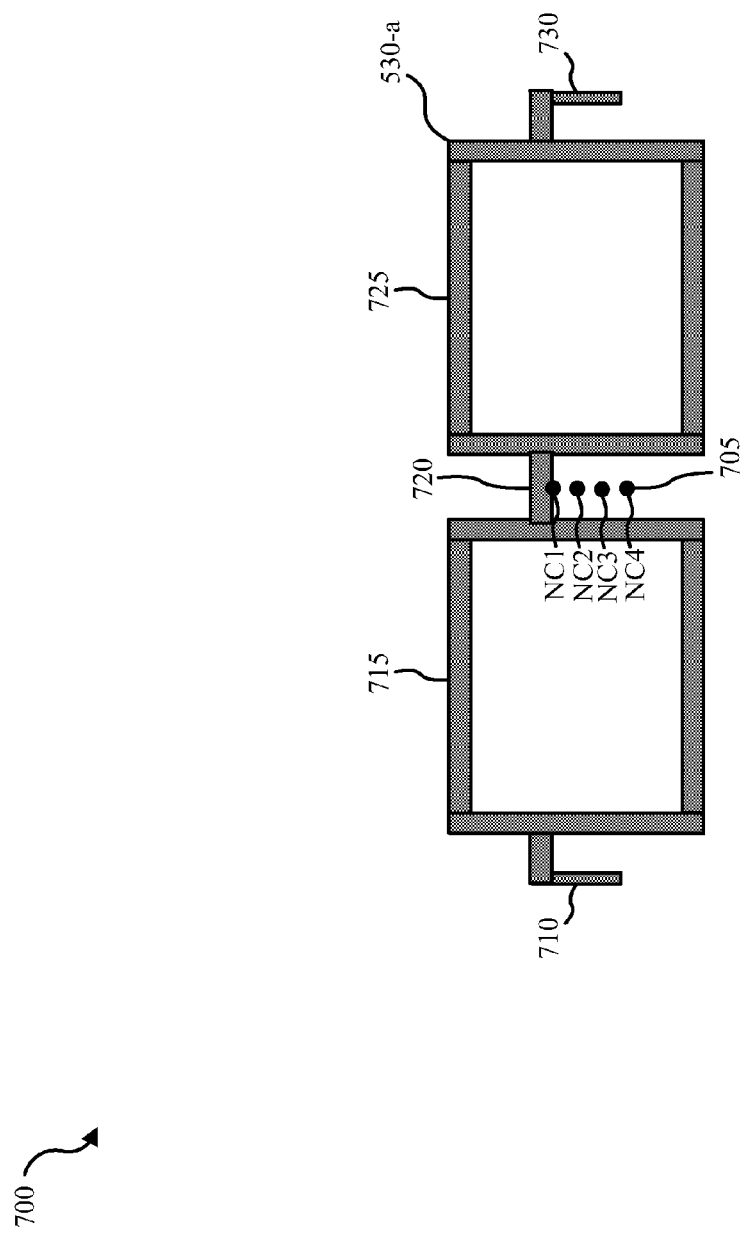
FIG. 7 is a diagram illustrating one example of a three-dimensional model of a pair of glasses.

FIG. 7 is a diagram 700 illustrating one example of a three-dimensional model of a pair of glasses 530-a. The three-dimensional model of the glasses 530-a may be an example of the three-dimensional model of the glasses 530 illustrated in FIG. 5. In one embodiment, the three-dimensional model of the glasses 530-a may include a right earpiece 710 (for contacting the right ear 535, for example), a right eyepiece 715, a bridge 720 (for contacting the nose 520, for example), a left eyepiece 725, and a left earpiece 730 (for contacting the left ear 730, for example). In one example, the three-dimensional model of the glasses 530-a may include a plurality of possible nose connection points (e.g., NC1, NC2, NC3, NC4) 705. Depending on the nose pad configuration of the three-dimensional model of the glasses 530-a and/or the width of the nose 520, the three-dimensional model of the glasses 530-a may connect with the nose 520 at different nose connection points 705. In some cases, the three-dimensional model of the glasses 530-a may be adjusted to account for differences in nose connection points 705. It is noted each nose connection point 705 may be matched to and connected with one of the nose points 605.

Figure 8:
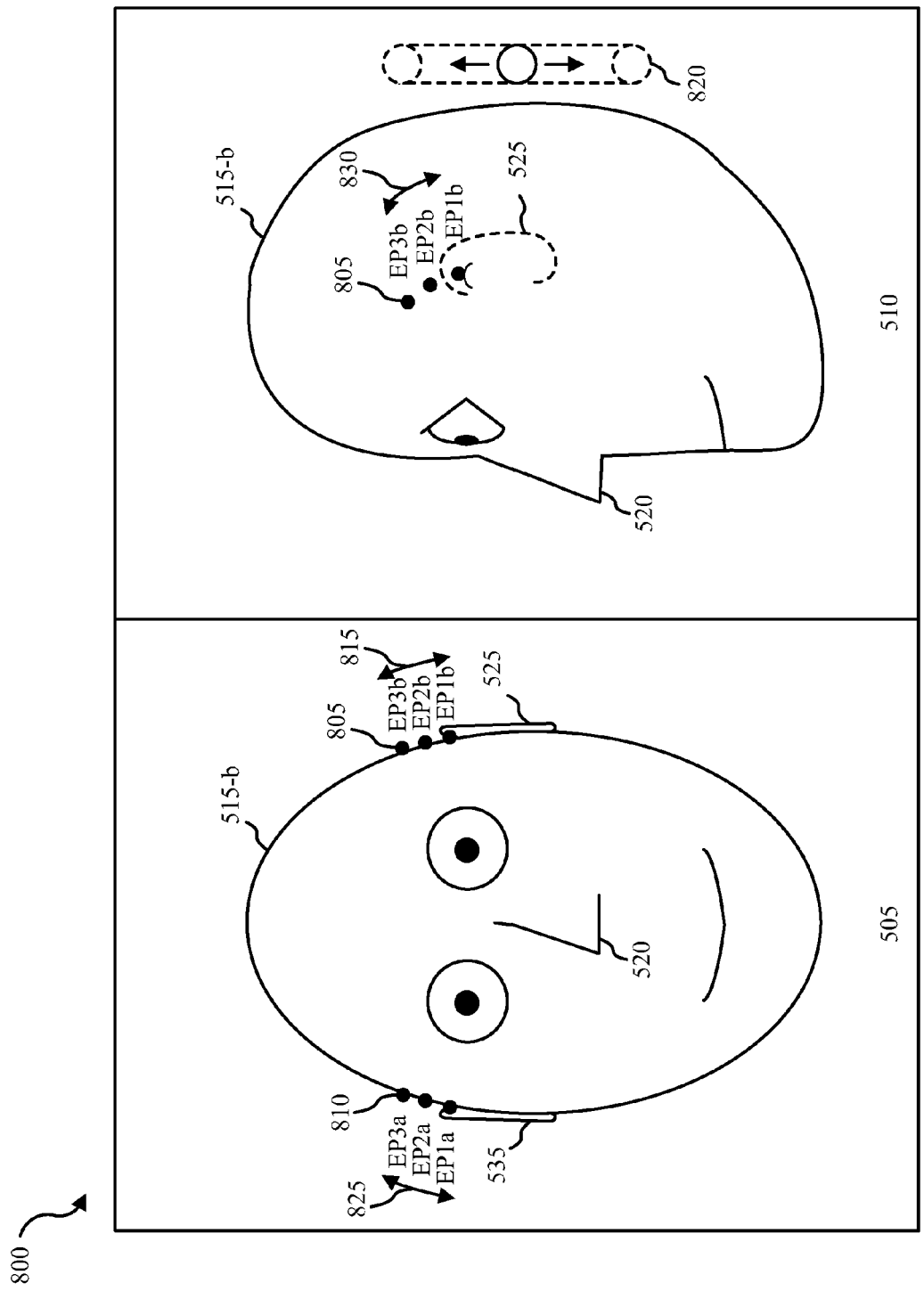
FIG. 8 is a diagram illustrating another example of attachment points on the three-dimensional model of the user.

FIG. 8 is a diagram 800 illustrating another example of attachment points on the three-dimensional model of the user 515-b. The three-dimensional model of the user 515-b may be an example of the three-dimensional model of the user 515 illustrated in FIG. 5 or 6. In one example, the three-dimensional model of the user 515-b may include a plurality of ear points (e.g., attachment points) 805, 810 at and above the ears 525, 535. Although, three ear points 805 are shown (e.g., EP1, EP2, EP3) in the present example, it is understood, that more or less ear points 805, 810 may be used.

As noted previously, the three-dimensional model of the user 515-b may be a morphable model 515-b. In one example, the plurality of ear points 805, 810 may correspond to particular points on the morphable model 515-b. As a result of being tied to specific points on the morphable model 515-b, each ear point 805, 810 will correspond to the same point on the morphable model 515-a regardless of the shape or size of the user's face. For instance, if the user has a larger head then the ear points 805, 810 will be spread further apart and if the user has a smaller head, then the ear points 805, 810 may be squished closer together. As a result, the ear point EP1a 810, EP1b 805 on a larger head may correspond to ear point EP1a 810, EP1b 805 on a smaller head. This may allow the three-dimensional model of the glasses to be positioned properly and consistently regardless of the size of the user's head.

In one example, a touch sensor 820 may be associated with the profile view 510. The touch sensor 820 may be used to adjust which ear point 805 the three-dimensional model of the glasses should be positioned at. In one example, a user may tilt a three-dimensional model of the glasses so that the temples rotate up and forward/down and back 830 and up and in/down and out 815, 825 by the ears 525, 535 by swiping or dragging a finger up/down on the touch sensor 820. In one example, the default ear points 805 may correspond to ear points EP1a 810, EP1b 805. In this example, sliding the touch sensor 820 up may select an ear point 805 up the side of the head (ear point EP2a 810, EP2b 805, for example) and sliding the touch sensor 820 down may not result in an adjustment. Typically, ear point EP1a 810, EP1b 805 correspond to the lowest that the ear pieces 710, 730 may go due to the connection between the ear 525 and the head. It is noted that although the ear points 805 appear to go up and forward/down and back 830 as illustrated in profile view 510, the ear points 805, 810 go up and in/down and out 825, 815.

Figure 9:
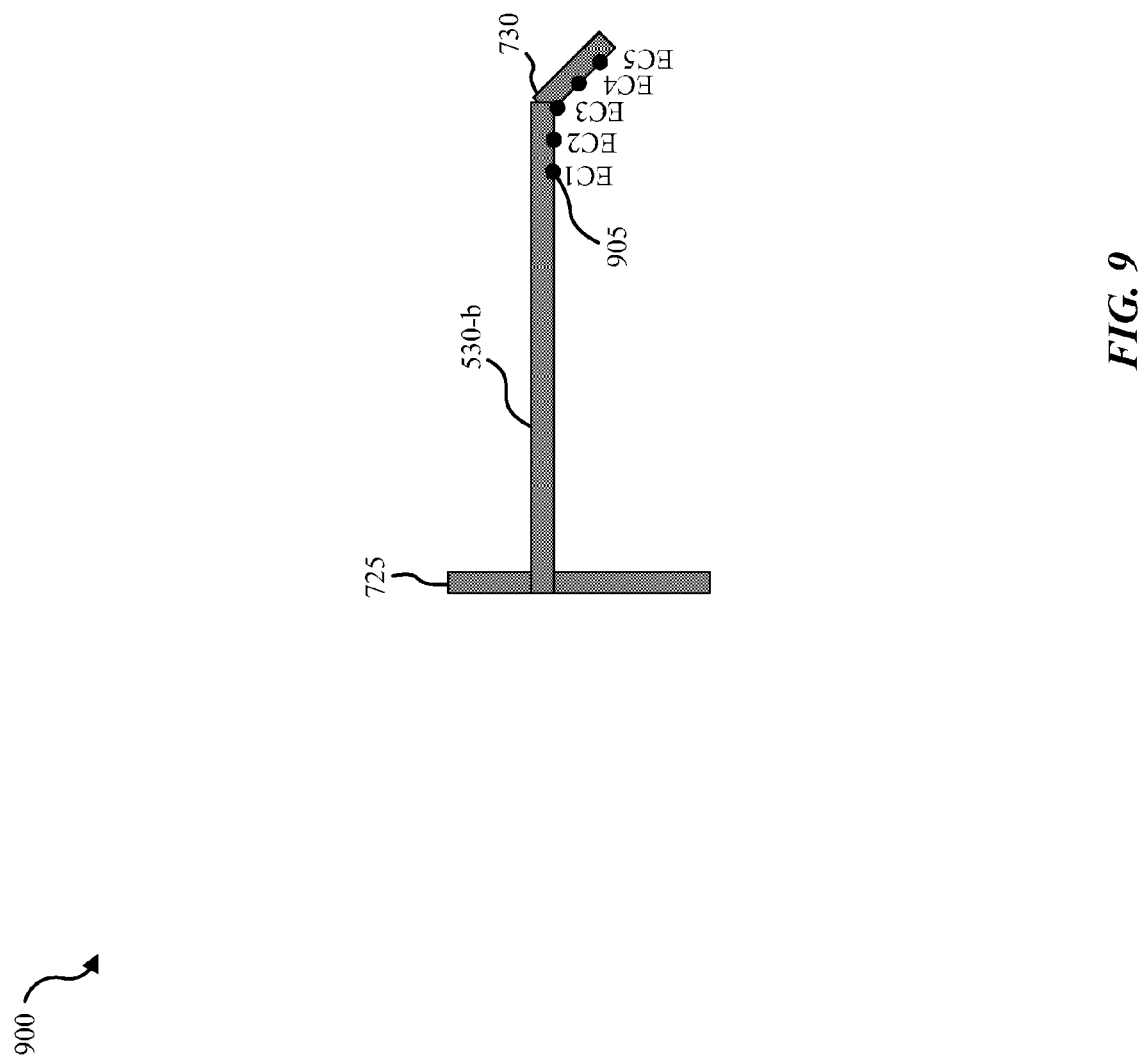
FIG. 9 is a diagram illustrating one example of a three-dimensional model of a pair of glasses.

FIG. 9 is a diagram 900 illustrating one example of a three-dimensional model of a pair of glasses 530-b. The three-dimensional model of the glasses 530-b may be an example of the three-dimensional model of the glasses 530 illustrated in FIG. 5 or 7. In one embodiment, each earpiece (e.g., left earpiece 730) may include a plurality of earpiece connection points (e.g., connection points) 905. For example, the three-dimensional model of the glasses 530-b may include a plurality of possible earpiece connection points (e.g., EC1, EC2, EC3, EC4, EC5) 905. Depending on the way the three-dimensional model of the glasses are positioned and/or situated on the three-dimensional model of the user, the three-dimensional model of the glasses 530-b may connect with the ear 525, 535 and/or head at different earpiece connection points 905. In some cases, the three-dimensional model of the glasses 530-b may be adjusted to account for differences in earpiece connection points 905. It is noted each earpiece connection point 905 may be matched to and connected with one of the ear points 805, 810.

Figure 10:
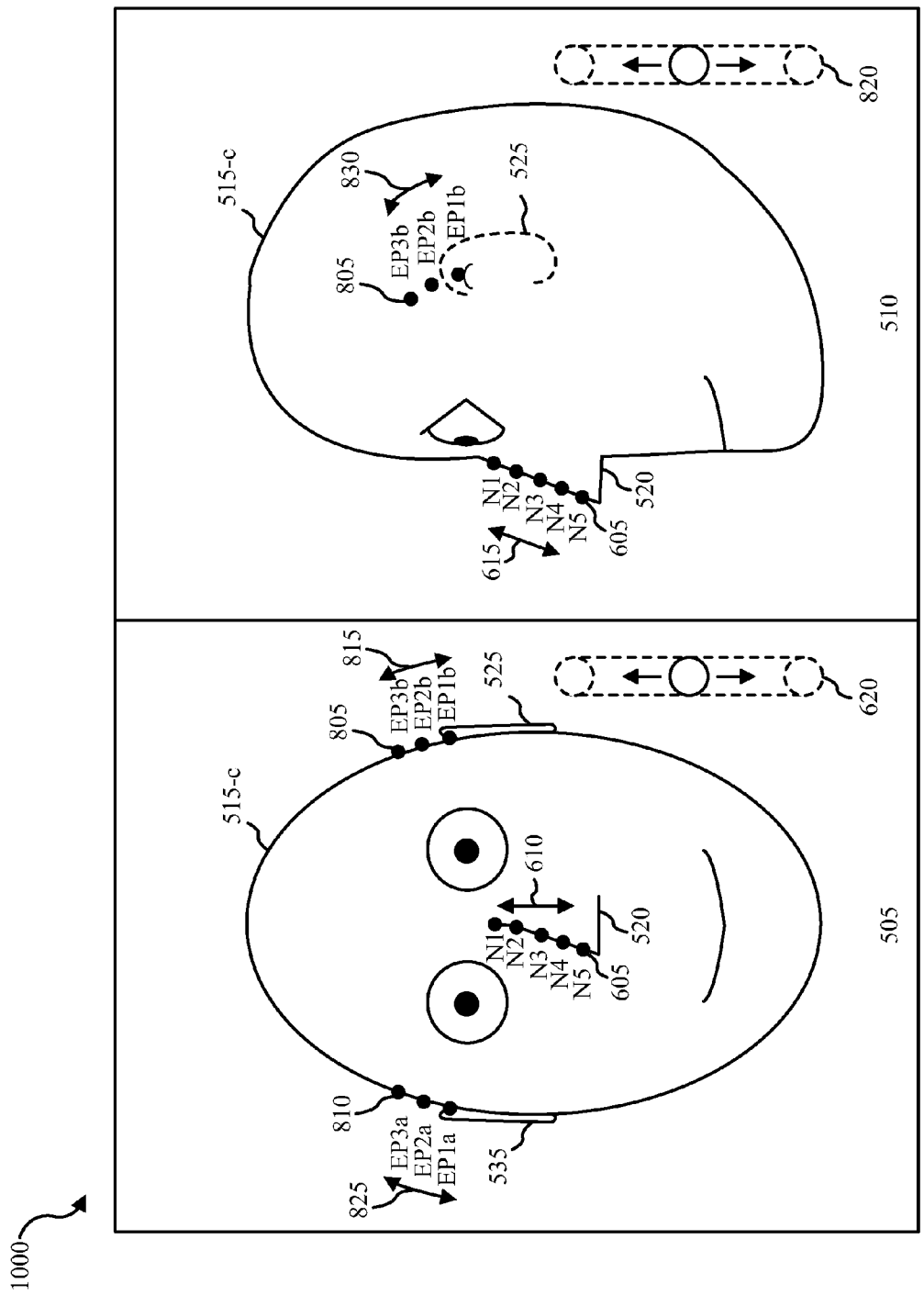
FIG. 10 is a diagram illustrating an example of attachment points on the three-dimensional model of the user.

FIG. 10 is a diagram 1000 illustrating an example of attachment points on the three-dimensional model of the user 515-c. The three-dimensional model of the user 515-c may be an example of the three-dimensional model of the user 515 illustrated in FIG. 5, 6 or 8. In this example, three-dimensional model of the user 515-c may include the nose points 605 and the ear points 805, 810 as described previously. In some configurations, a combination of nose points 605 and ear points 805, 810 may be used to define a set of attachment points (e.g., a position). In one example, a default position may correspond to nose point N2 605 and ear points EP1a 810, EP1b 805. If the touch sensor 820 associated with the profile view 510 is used to adjust the tilt (tilt forward, for example) a three-dimensional model of glasses, then the set of attachment points (for the preselected position, for example) may correspond to nose point N2 605 and ear points EP2a 810, EP2b 805. Similarly, if the touch sensor 620 associated with the frontal view 505 is used to adjust how far (slide down, for example) the three-dimensional model of the glasses slides down the nose 520, then the set of attachment points (for this position, for example) may correspond to nose point N3 605 and ear points EP2a 810, EP2b 805. As a result, the three-dimensional model of the user 515-c and a three-dimensional model of a pair of glasses may be combined in numerous different positions based on various combinations of attachment points (and/or connection points, for example).

Figure 11:
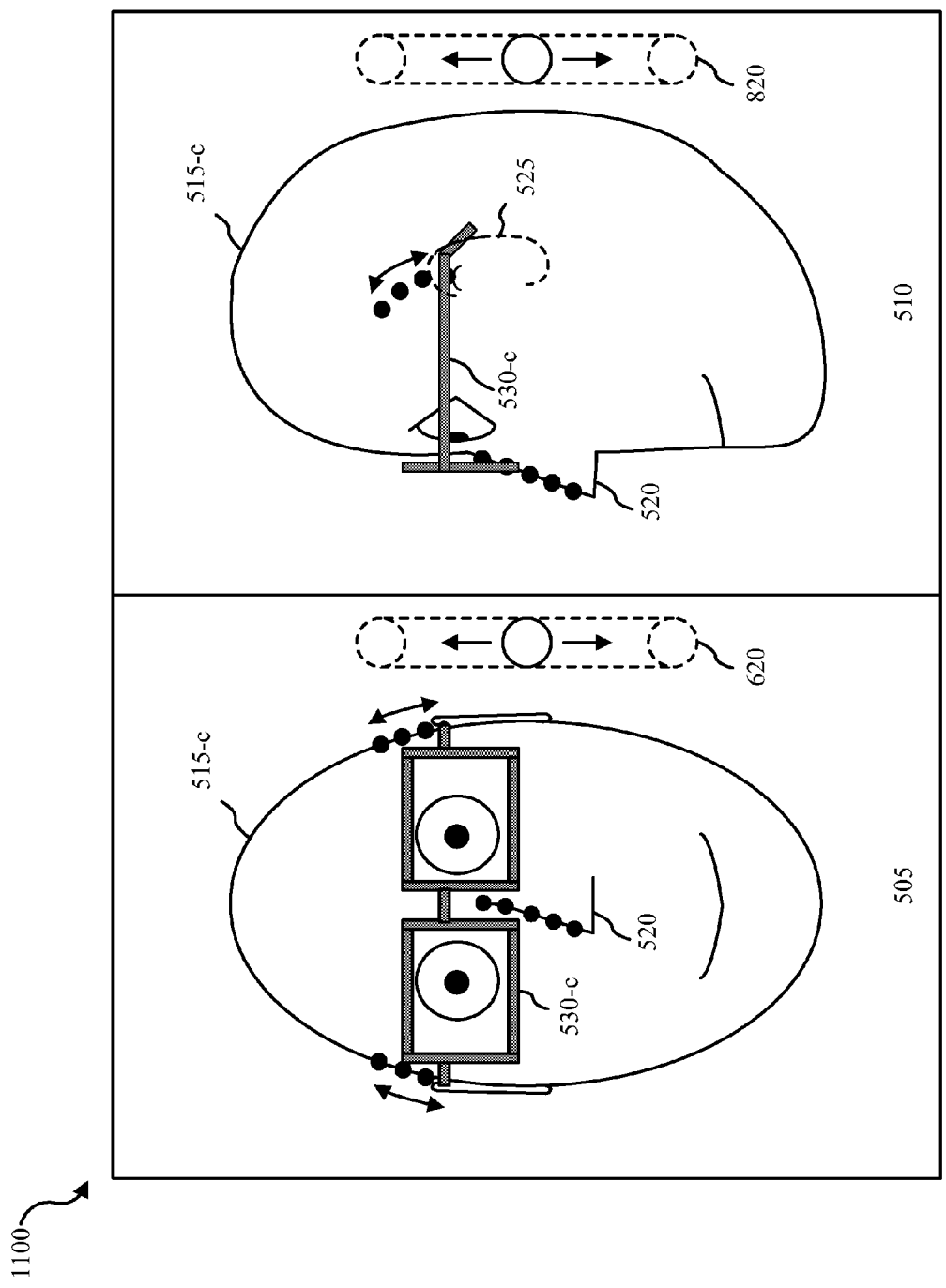

FIG. 11 is a diagram 1100 illustrating an example of a modeled try-on. In this example, the three-dimensional model of the user 515-c and the three-dimensional model of the glasses 530-c may be combined based on a selected position. The three-dimensional model of the glasses 530-c may be an example of the three-dimensional model of the glasses 530 illustrated in FIG. 5, 7, or 9. In this example, a nose point (N2, for example) 605 may be matched with a nose connection point (NC4, for example) and ear points (EP1a 810, EP1b 805, for example) 805, 810 may be matched with an earpiece connection point (EC3, for example) 905. As a result, the modeled try-on may be a modeled try-on with the glasses in a specific (and reproducible, position). As discussed previously, the touch sensor 620 associated with the frontal view 505 and the touch sensor 820 associated with the profile view 510 may allow the position (and situation, for example) of the three-dimensional model of the glasses 530-c to be adjusted.

Figure 12:
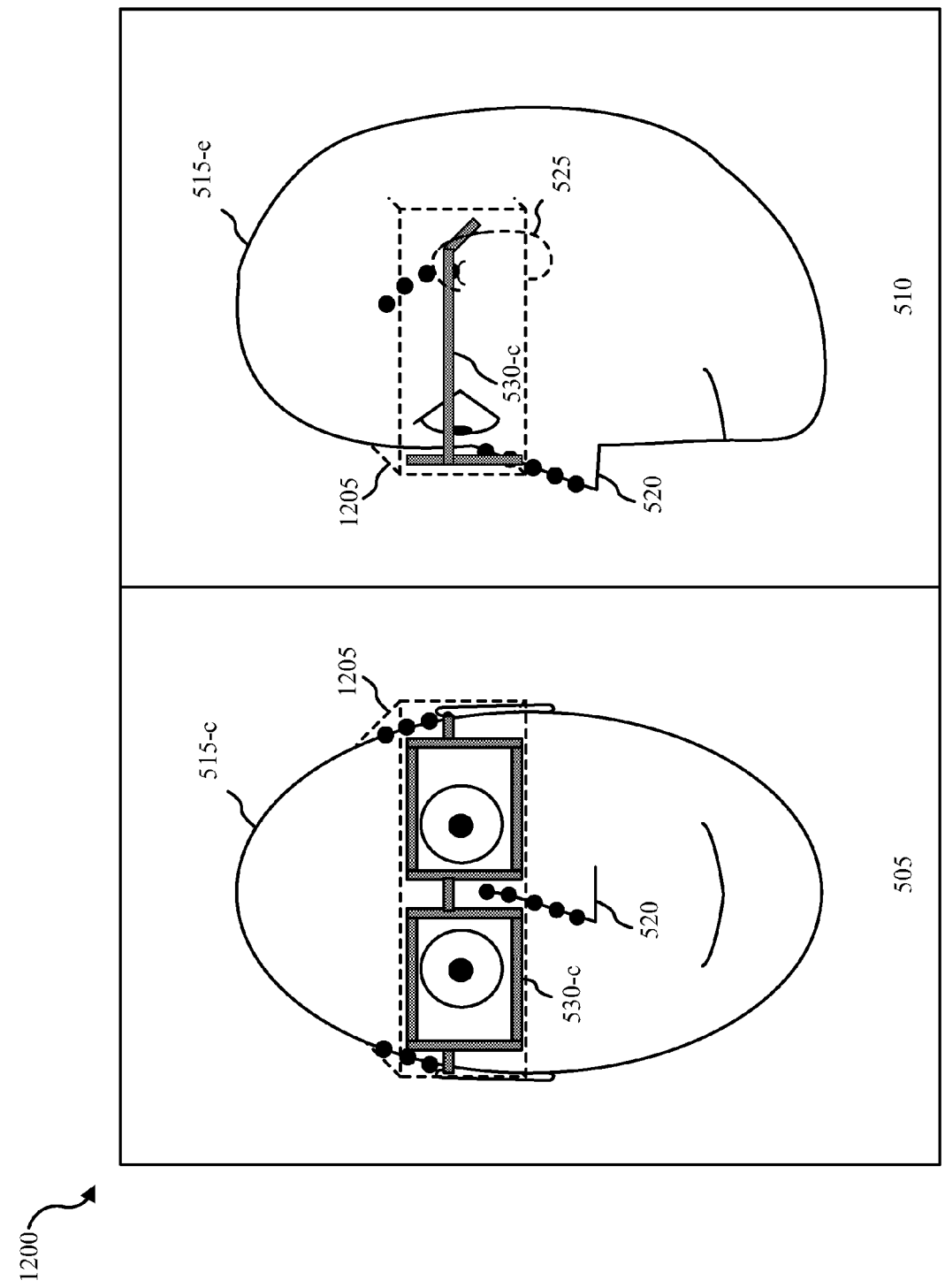

FIG. 12 is a diagram 1200 illustrating an example of a rendering box 1205 for rendering a portion of a modeled try-on. As described previously, the modeled try-on may include the three-dimensional model of the user 515-c and a three-dimensional model of a pair of glasses 530-c. Regardless of the way the three-dimensional model of the glasses 530-c is positioned with respect to the three-dimensional model of the user 515-c, the three-dimensional model of the glasses 530-c may cover only a portion of the three-dimensional model of the user 515-c. The various interactions resulting from the combination of the three-dimensional model of the user 515-c and the three-dimensional model of the glasses 530-c (e.g., shadows, reflections, etc.) may also only cover a portion of the three-dimensional model of the user 530-c. As a result, the rendering may be limited to the portion of the modeled try-on that includes the visible portions of the three-dimensional model of the glasses 530-c and the visual interactions as a result of the addition of the three-dimensional model of the glasses 530-c. In one example, the bounding box 1205 may represent the portion of the modeled try-on that is to be rendered. As illustrated in this example, the bounding box 1205 may be a three-dimensional box. It is noted that reducing the area that needs to be rendered may reduce computations and increase efficiency. This may be particularly beneficial when adjustments are made (so that the adjustments may be rendered and reflected in an image in realtime, for example).

FIGS. 13-22 illustrate various examples of a virtual try-on using the systems and methods described herein. In these examples, the three-dimensional model of the user and the three-dimensional model of the glasses have been combined based on a matching of a set of selected connection points to a set of selected attachment points (based on an initial position or an adjusted position, for example). In these examples, one or more images may be rendered based on the resulting modeled try-on. The rendered images may then be used to provide a virtual try-on experience (that is displayed via the display 125, for example).

Figure 13:
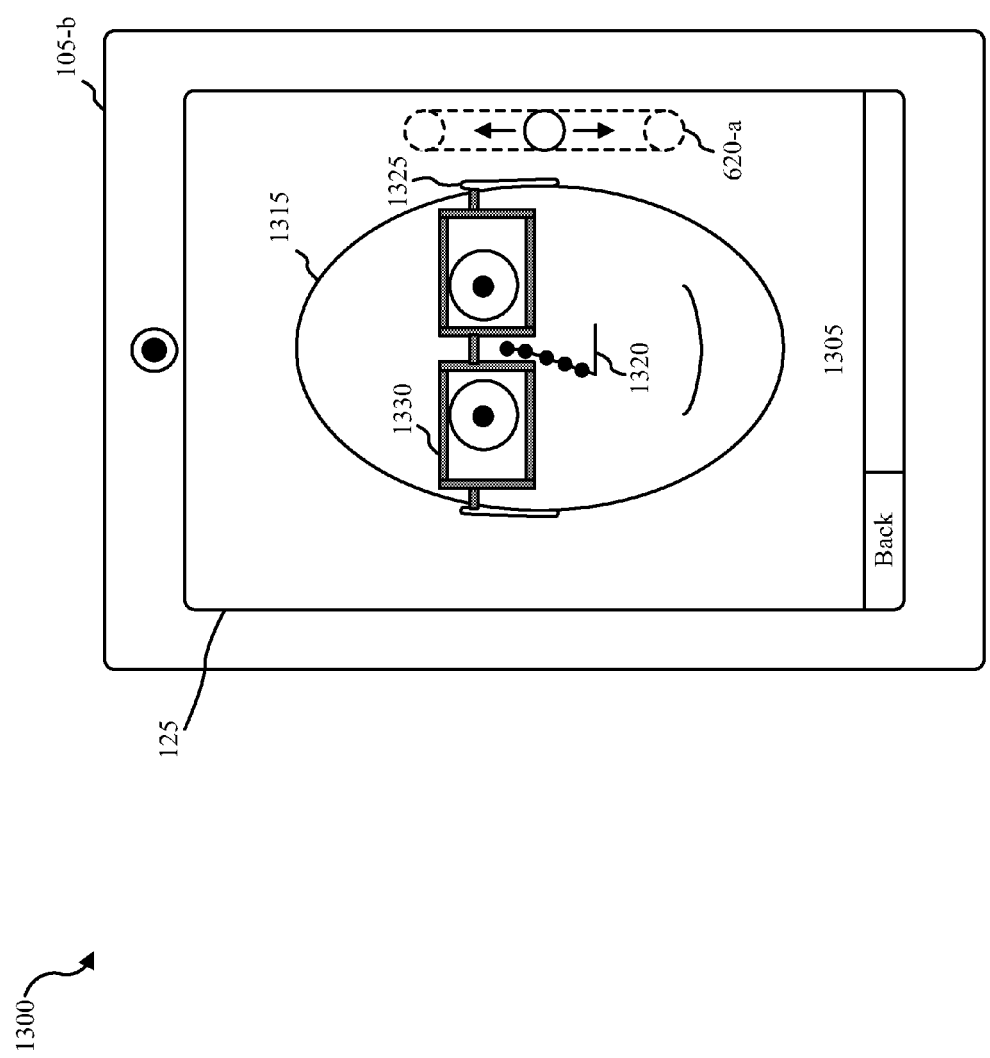
FIGS. 13-22 illustrate various examples of a virtual try-on using the systems and methods described herein.

FIG. 13 is a diagram 1300 illustrating an example of a device 105-b that is providing a virtual try-on experience. The device 105-b may be an example of the device 105 illustrated in FIG. 1 or 2. In one example, the display 125 may display one or more images to provide a virtual try-on experience. In one example, the virtual try-on experience may include an image of a user 1315 that has been rendered (or overlaid with a portion of a rendered image, for example) to show the user virtually trying-on a pair of glasses 1330. In one example, the image of the user 1315 may correspond to an image of the user that does not include the virtually tried-on glasses 1330. The image of the user may include a nose 1320 and one or more ears 1325. In the virtual try-on experience, the position of the glasses 1330 may correspond to the position of the three-dimensional model of the glasses in the modeled try-on.

Figure 14:
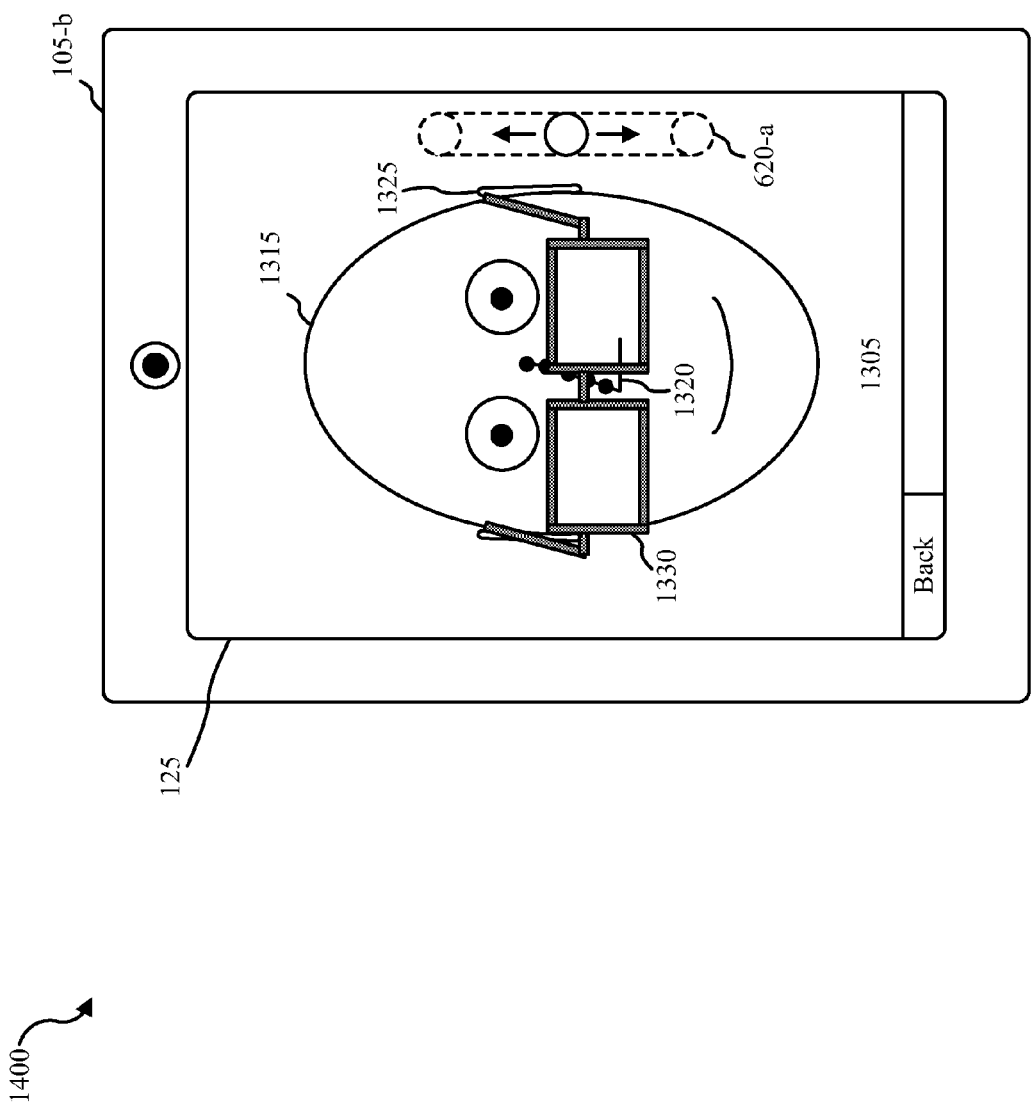

In this example, the display 125 may display a frontal view 1305 of a virtual try-on. In one example, the display 125 may include a touch sensor 620-a that allows a user to adjust the position of the glasses 1330 (as described previously, for example). In one example, the display 125 may be a touch screen display and the touch sensor 620-a for adjusting the frontal view 1305 may be anywhere within the portion of the display 125 that is displaying the frontal view 1305 (in this case, the entire display). This interface may allow a user to adjust the position of the glasses (the position along the nose, for example) by simply swiping or sliding the glasses 1330 up or down the nose 1320. The attachment points are shown for illustrative purposes only (indicating the possible positions of adjustment along the nose 1320). The possible attachment points may not typically be shown. FIG. 14 is a diagram 1400 that illustrates the result of a touch input used to adjust the glasses 1330 (using the touch sensor 620-a, for example).

Figure 15:
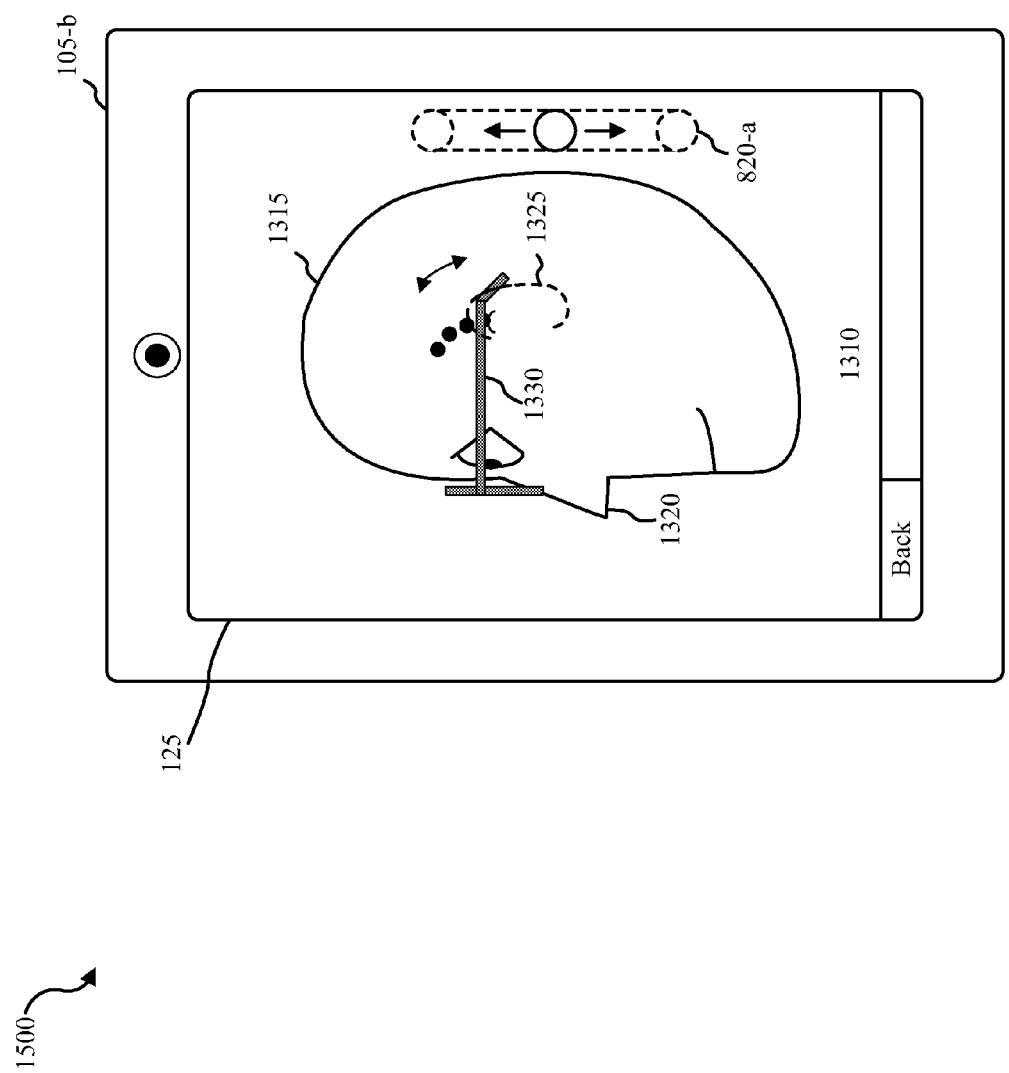
Figure 16:
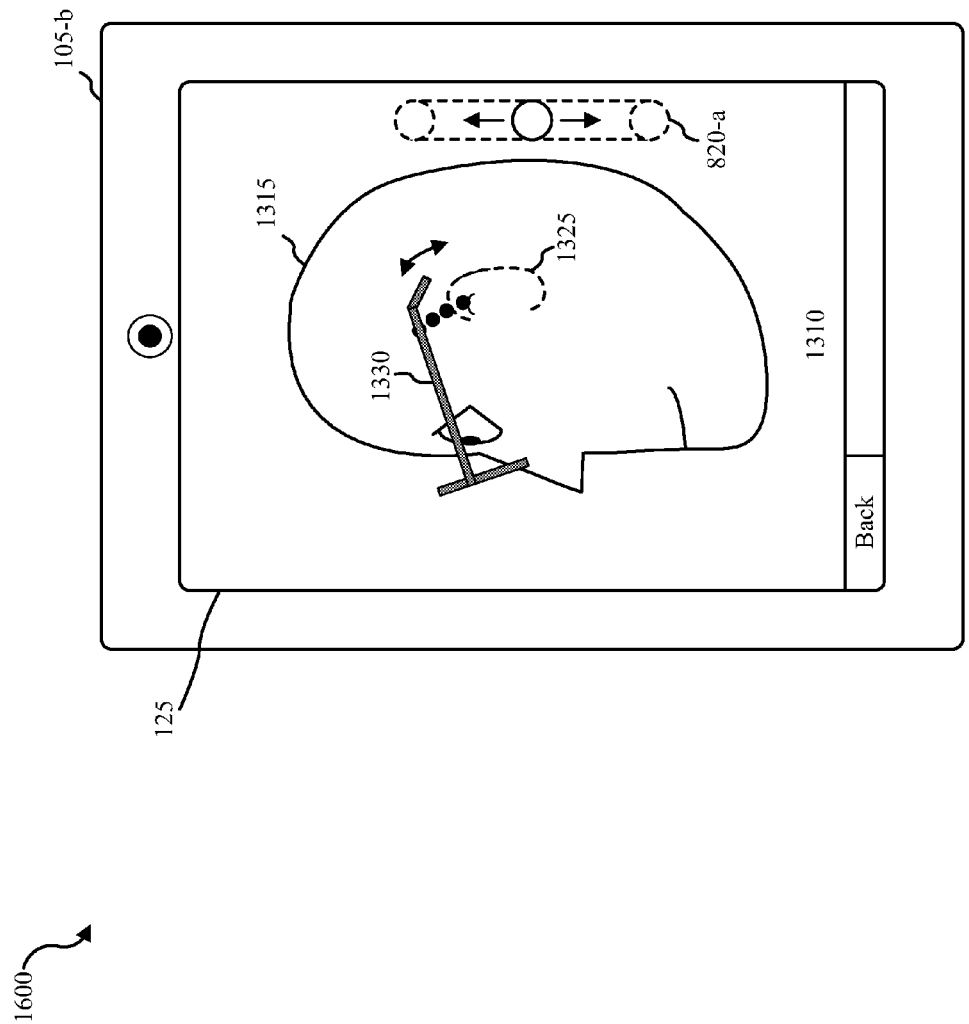

FIG. 15 is a diagram 1500 illustrating an example of a device 105-b that is providing a virtual try-on experience. The example illustrated in FIGS. 15-16 is similar to the example shown in FIGS. 13-14 except that in this example, the display 125 may display the virtual try-on experience in the profile view 1310. The profile view 1310 may more fully illustrate the relationship between the temples and earpieces of the glasses 1330 and the user's 1315 head and ear 1325. The attachment points are shown for illustrative purposes only (indicating the possible positions of adjustment along the head by the ear 1325). The possible attachment points may not typically be shown. In one example, the display 125 may include a touch sensor 820-a that allows a user to adjust the position of the glasses 1330 (as described previously, for example). In one example, the display 125 may be a touch screen display and the touch sensor 820-a may be used to adjust the position of the glasses 1330 in the profile view 1310. In one example, the touch sensor 820-a may be used to adjust the tilt of the glasses 1330 from anywhere within the portion of the display 125 that is displaying the profile view 1310 (in this case, the entire display). This interface may allow a user to adjust the position of the glasses (the tile of the glasses 1330, for example) by simply swiping or sliding the temple or earpiece of the glasses 1330 up or down along the side of the head by the ear 1325. FIG. 16 is a diagram 1600 that illustrates the result of a touch input used to adjust the glasses 1330 (using the touch sensor 820-a, for example).

Figure 17:
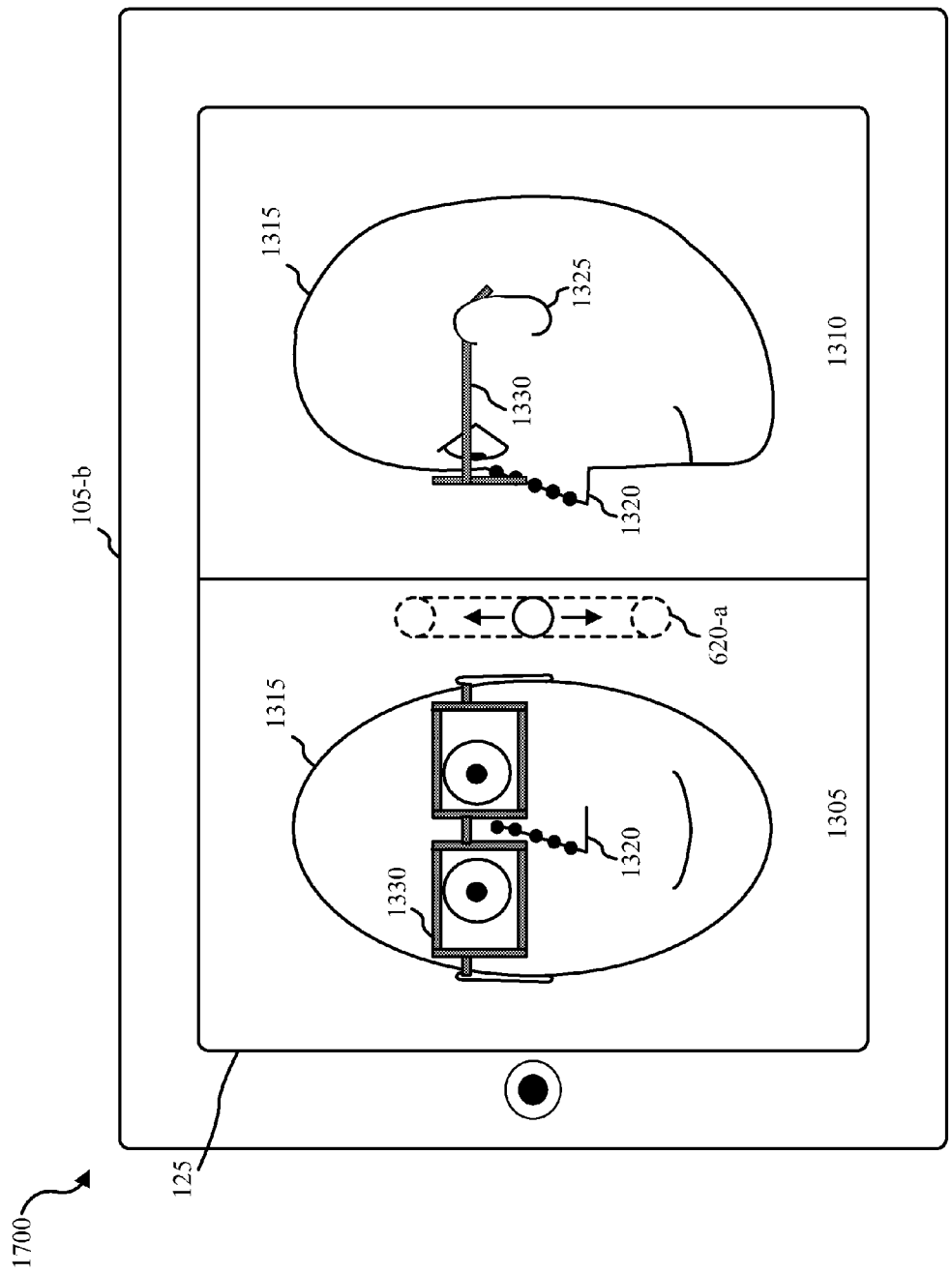
Figure 18:
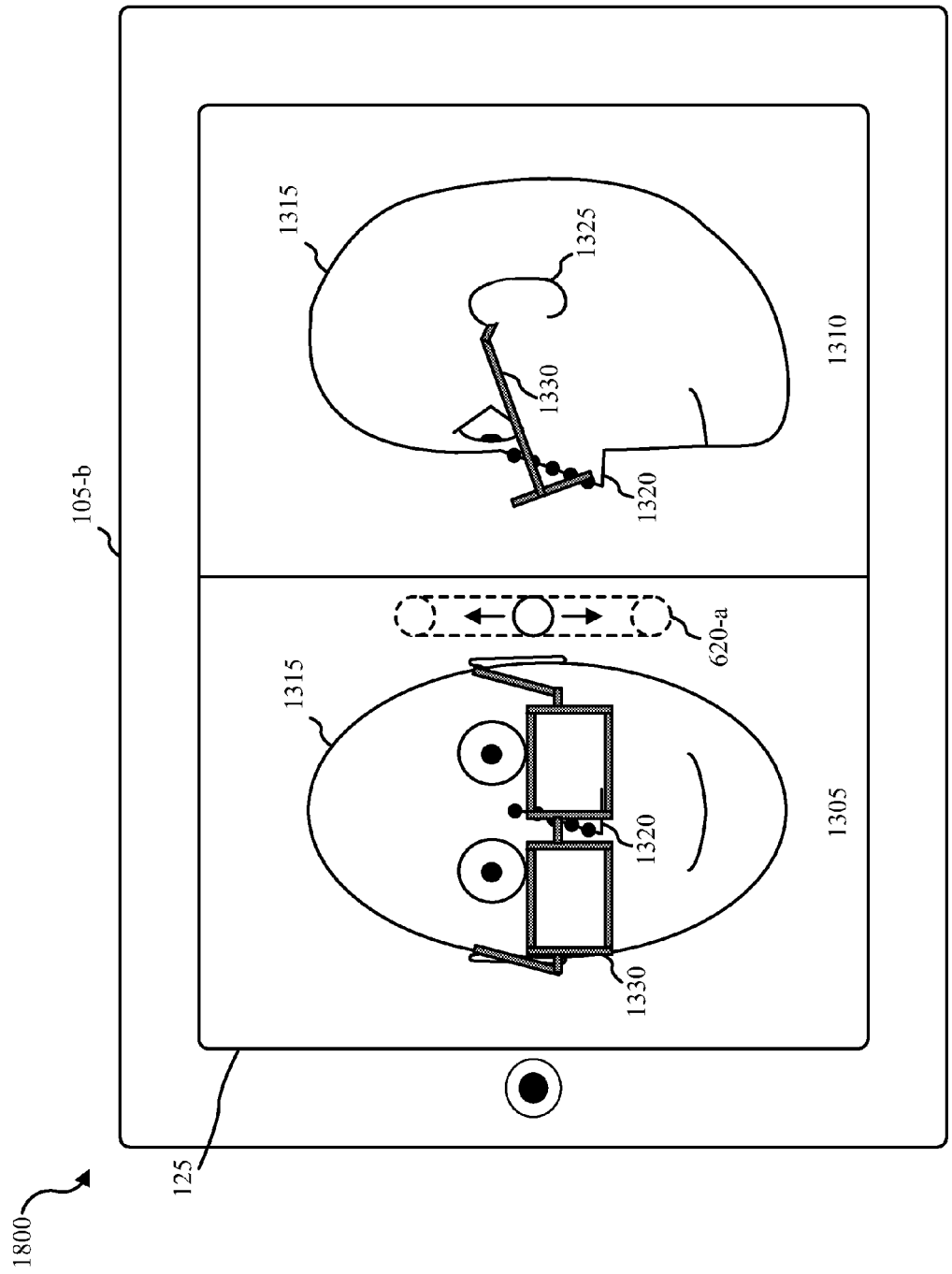

FIG. 17 is a diagram 1700 illustrating an example of a device 105-b that is providing a virtual try-on experience. The example illustrated in FIGS. 17-18 is similar to the example shown in FIGS. 13-14 except that in this example, the display 125 may display the virtual try-on experience in both the frontal view 1305 and the profile view 1310 simultaneously. As described previously, the touch sensor 620-a may adjust the position of the glasses along the nose. In some cases, the touch sensor 620-a may be anywhere within the frontal view 1305, but not in the profile view 1310. The attachment points are shown for illustrative purposes only (indicating the possible positions of adjustment along the nose 1320). The possible attachment points may not typically be shown. FIG. 18 is a diagram 1800 that illustrates the result of a touch input used to adjust the glasses 1330 (using the touch sensor 620-a, for example).

Figure 19:
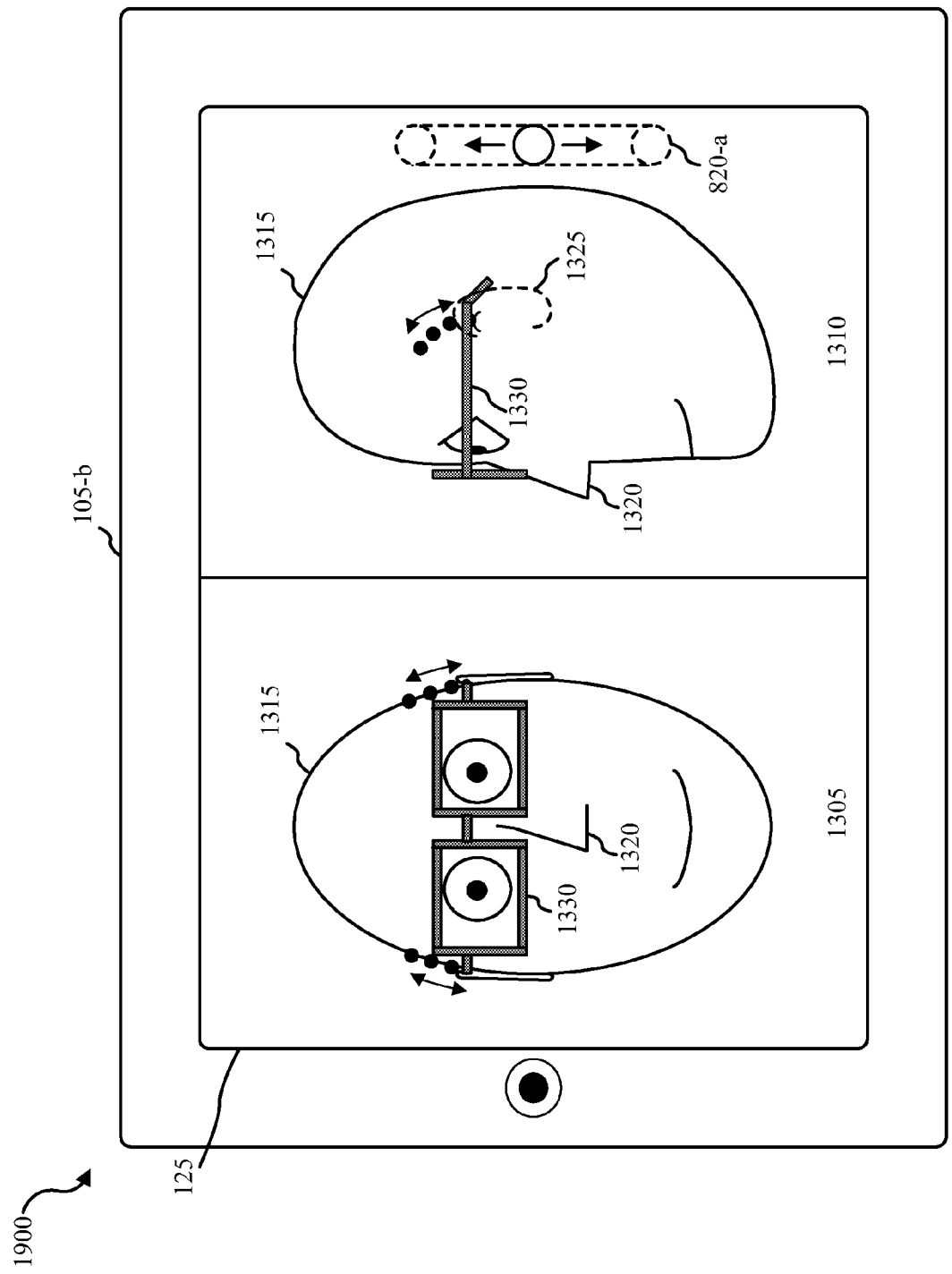
Figure 20:
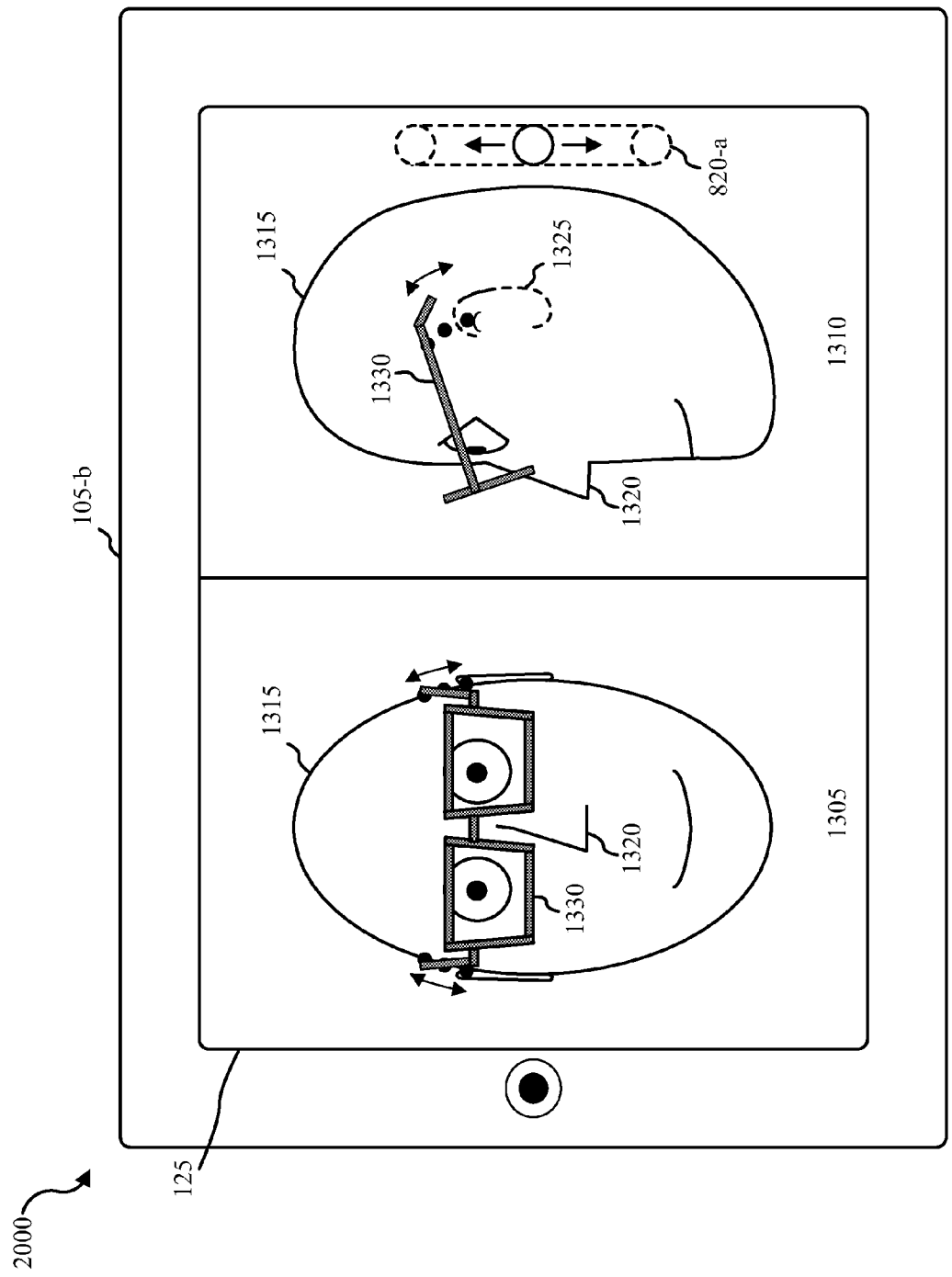

FIG. 19 is a diagram 1900 illustrating an example of a device 105-b that is providing a virtual try-on experience. The example illustrated in FIGS. 19-20 is similar to the example shown in FIGS. 15-16 except that in this example, the display 125 may display the virtual try-on experience in both the frontal view 1305 and the profile view 1310 simultaneously. As described previously, the touch sensor 820-a may adjust the position of the glasses along the head by the ear 1325. In some cases, the touch sensor 820-*a* may be anywhere within the profile view 1310, but not in the frontal view 1305. The attachment points are shown for illustrative purposes only (indicating the possible positions of adjustment along the head by the ear 1325). The possible attachment points may not typically be shown. FIG. 20 is a diagram 2000 that illustrates the result of a touch input used to adjust the glasses 1330 (using the touch sensor 820-*a*, for example).

Figure 21:
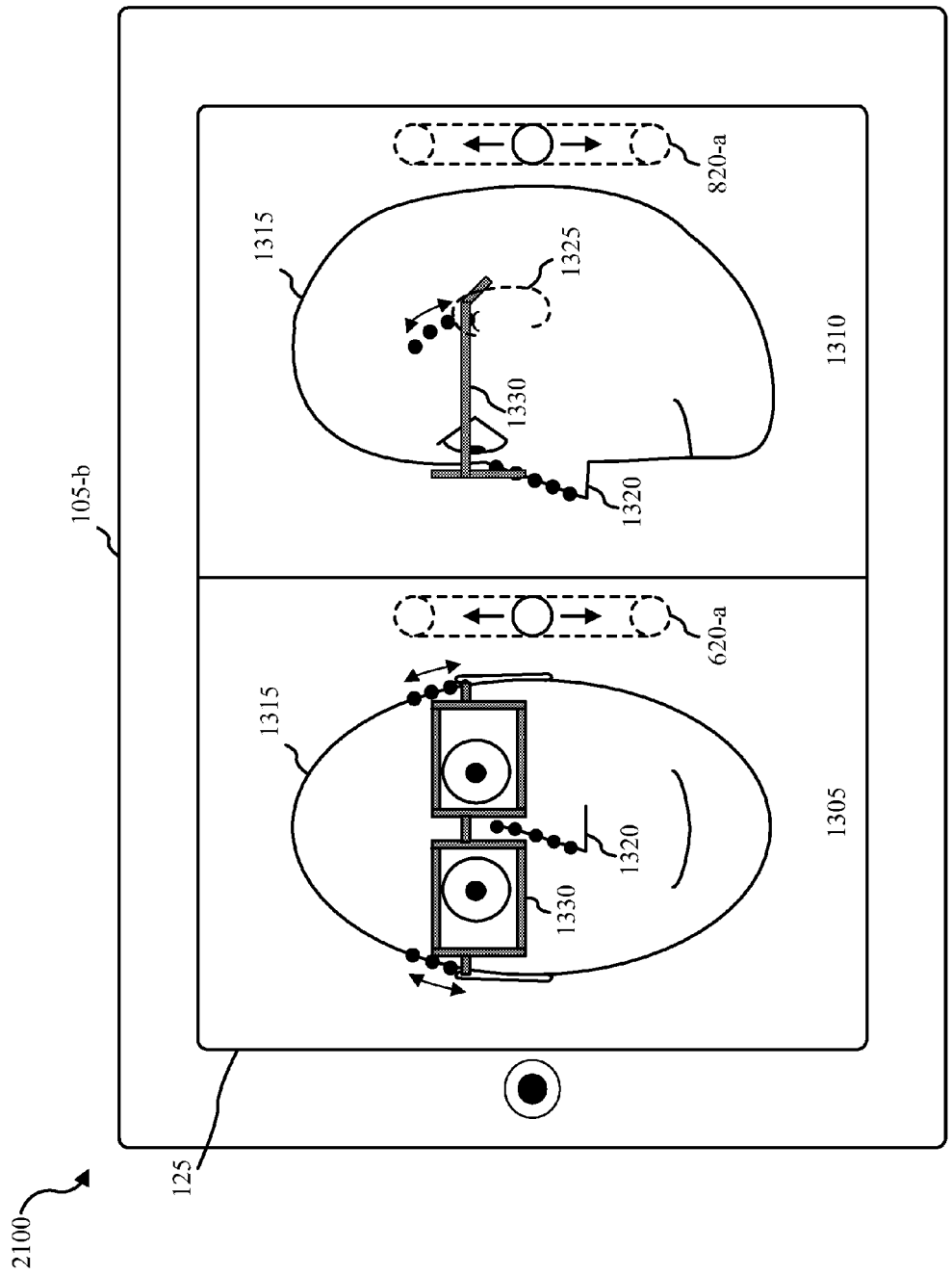
Figure 22:
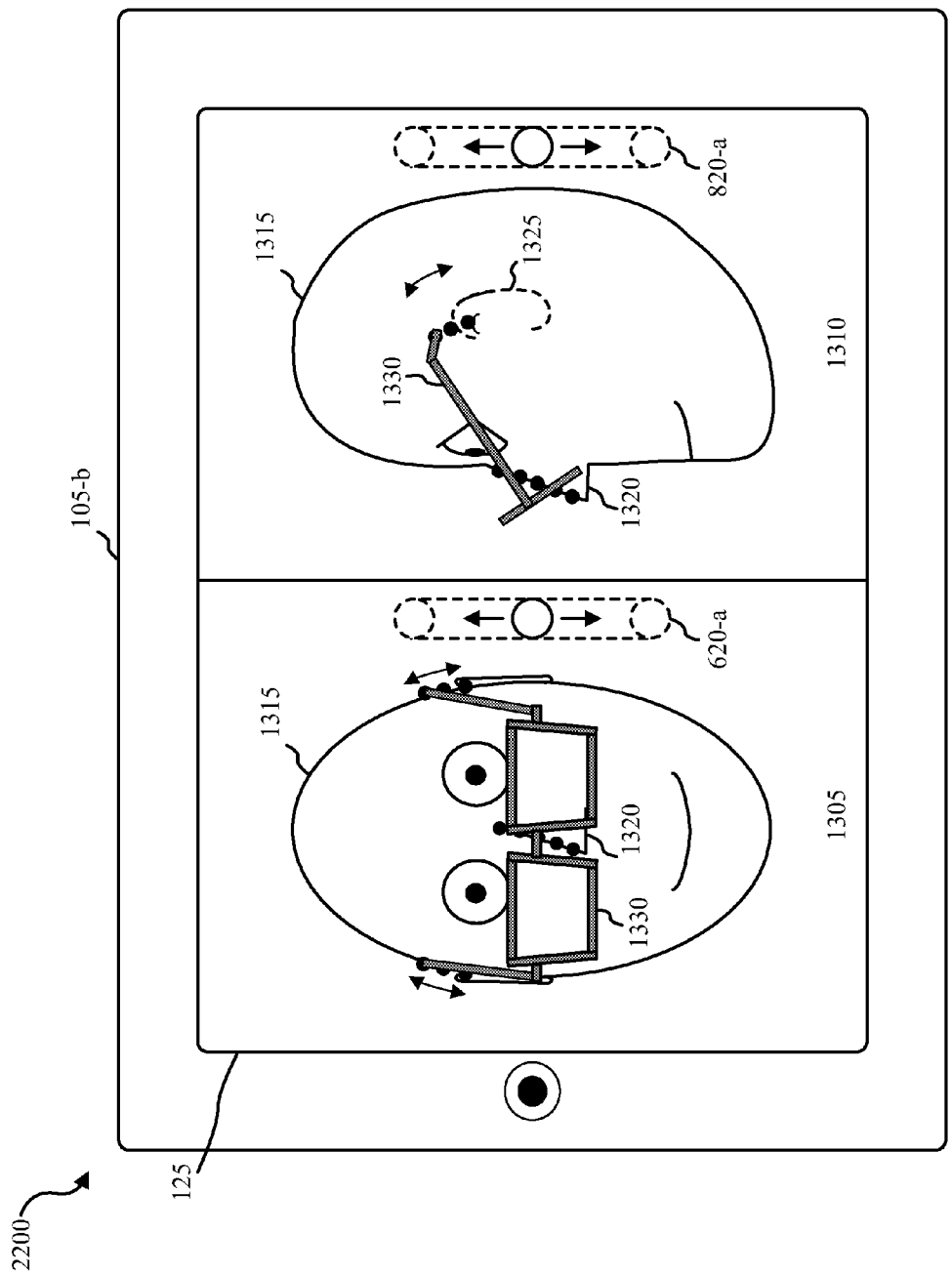

FIG. 21 is a diagram 2100 illustrating an example of a device 105-*b* that is providing a virtual try-on experience. The example illustrated in FIGS. 19-20 is similar to the example shown in FIGS. 13-20 except that in this example, the display 125 may display the virtual try-on experience in both the frontal view 1305 and the profile view 1310 simultaneously. In this example, adjustments along the nose 1320 may be made in the frontal view 1305 via the touch sensor 620-*a* and adjustments of the tilt of the glasses 1330 may be made in the profile view 1310 via the touch sensor 820-*a*. In one example, the touch sensor 620-*a* may be anywhere within the frontal view 1305, but not in the profile view 1310 and the touch sensor 820-*a* may be anywhere within the profile view 1310, but not in the frontal view 1305. The attachment points are shown for illustrative purposes only (indicating the possible positions of adjustment along the nose 1320 and/or along the head by the ear 1325). The possible attachment points may not typically be shown. As a result of the touch sensor 620-*a* and the touch sensor 820-*a* being available simultaneously, the position of the glasses 1330 with respect to the nose 1320 and the ears 1325 may be adjusted simultaneously. FIG. 22 is a diagram 2200 that illustrates the result of a touch input used to adjust the glasses 1330 (using both the touch sensor 620-*a* and the touch sensor 820-*a*, for example).

Figure 23:
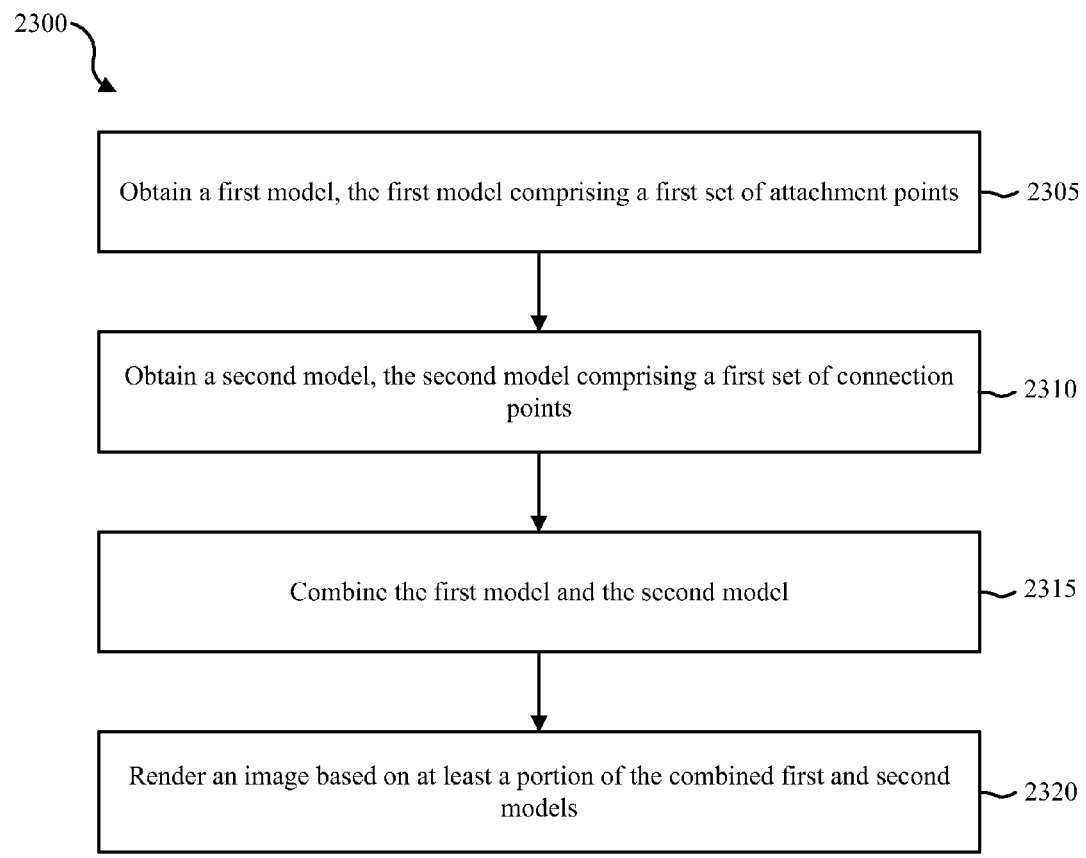

FIG. 23 is a flow diagram illustrating one example of a method 2300 to generate a virtual try-on. In some configurations, the method 2300 may be implemented by the virtual try-on module 115 illustrated in FIG. 1, 2, or 3. At block 2305, a first model may be obtained. The first model may include a first set of attachment points. At block 2310, a second model may be obtained. The second model may include a first set of connection points. At block 2315, the first model and the second model may be combined. For example, the first model and the second model may be combined by matching the first set of attachment points with the first set of connection points. At block 2320, an image may be rendered based on at least a portion of the combined first and second models.

Thus, the method 2300 may allow for generating a virtual try-on. It should be noted that the method 2300 is just one implementation and that the operations of the method 2300 may be rearranged or otherwise modified such that other implementations are possible.

Figure 24:
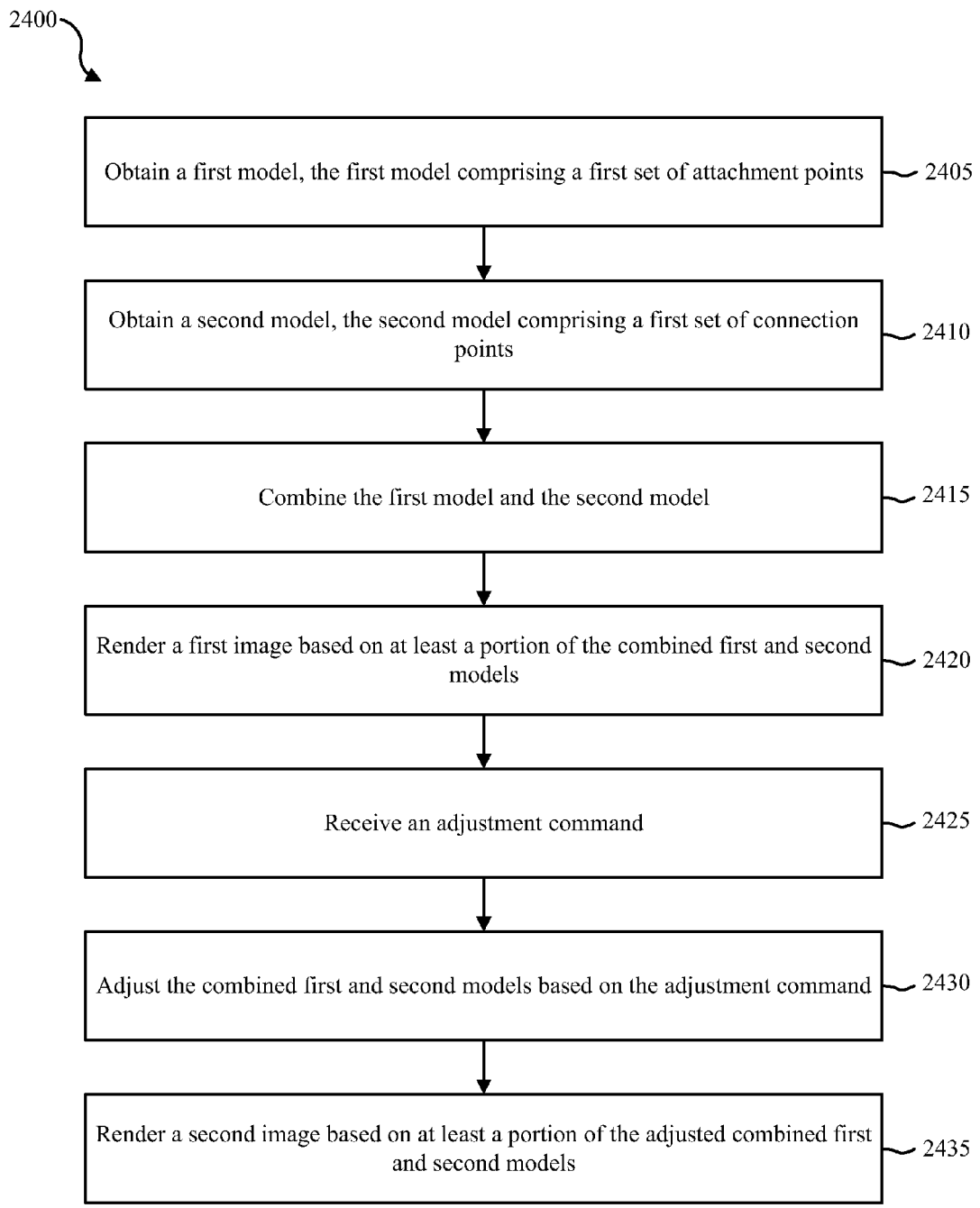

FIG. 24 is a flow diagram illustrating one example of a method 2400 to adjust a virtual try-on. In some configurations, the method 2400 may be implemented by the virtual try-on module 115 illustrated in FIG. 1, 2, or 3. At block 2405, a first model may be obtained. The first model may include a first set of attachment points. At block 2410, a second model may be obtained. The second model may include a first set of connection points. At block 2415, the first model and the second model may be combined. For example, the first model and the second model may be combined by matching the first set of attachment points with the first set of connection points. At block 2420, a first image may be rendered based on at least a portion of the combined first and second models. At block 2425, an adjustment command may be received. In one example, the adjustment command may be a touch input made with respect to a virtual try-on experience. At block 2430, the combined first and second models may be adjusted based on the adjustment command. At block 2435, a second image may be rendered based on at least a portion of the adjusted combined first and second models.

Thus, the method 2400 may allow for adjusting a virtual try-on. It should be noted that the method 2400 is just one implementation and that the operations of the method 2400 may be rearranged or otherwise modified such that other implementations are possible.

Figure 25:
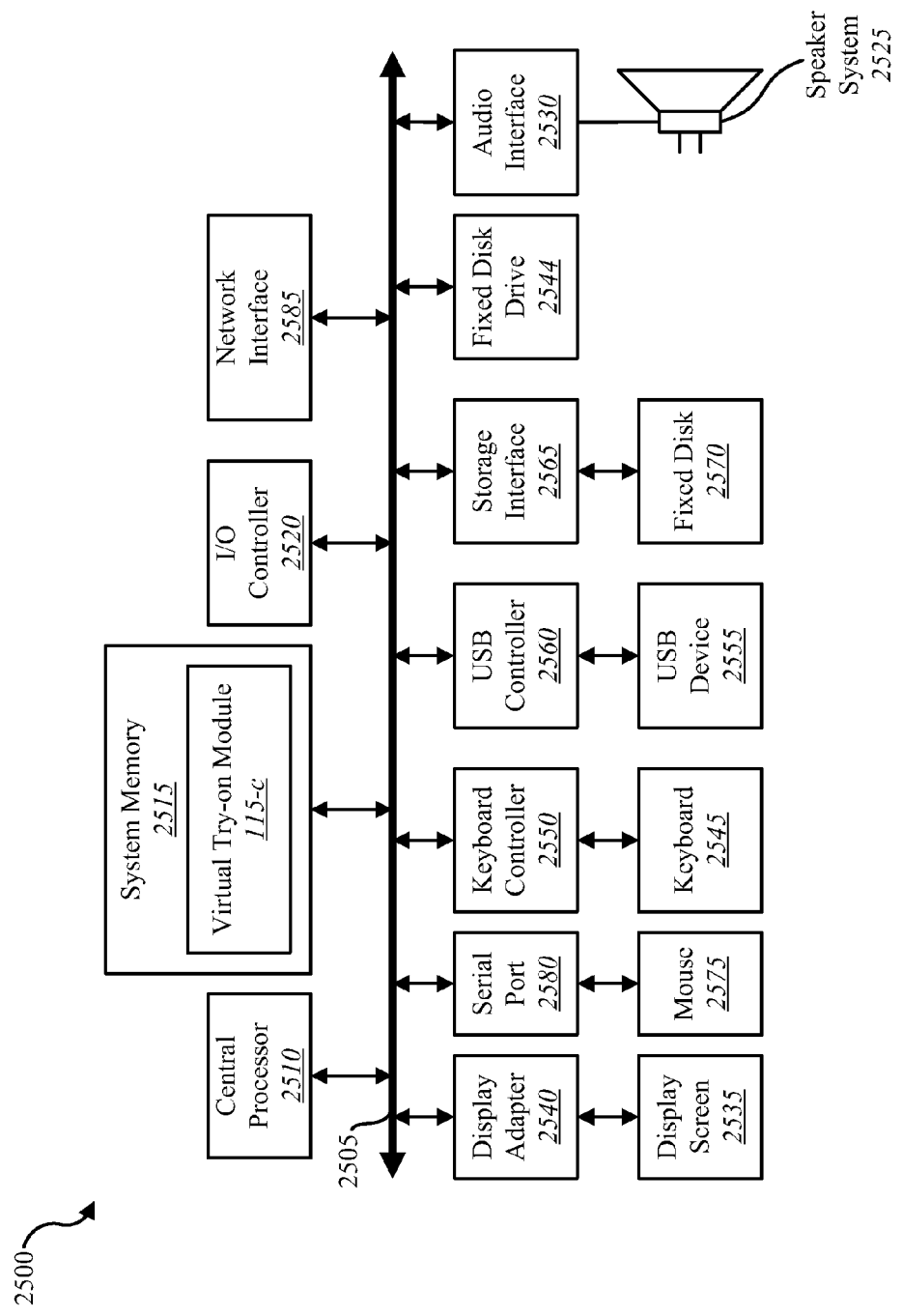
FIG. 25 depicts a block diagram of a computer system suitable for implementing the present systems and methods.

FIG. 25 depicts a block diagram of a computer system 2500 suitable for implementing the present systems and methods. For example, the computer system 2500 may be suitable for implementing the device 105 illustrated in FIG. 1, 2, or 13-22 and/or the server 210 illustrated in FIG. 2. Computer system 2500 includes a bus 2505 which interconnects major subsystems of computer system 2500, such as a central processor 2510, a system memory 2515 (typically RAM, but which may also include ROM, flash RAM, or the like), an input/output controller 2520, an external audio device, such as a speaker system 2525 via an audio output interface 2530, an external device, such as a display screen 2535 via display adapter 2540, a keyboard 2545 (interfaced with a keyboard controller 2550) (or other input device), multiple universal serial bus (USB) devices 2555 (interfaced with a USB controller 2560), and a storage interface 2565. Also included are a mouse 2575 (or other pointand-click device) interfaced through a serial port 2580 and a network interface 2585 (coupled directly to bus 2505).

Bus 2505 allows data communication between central processor 2510 and system memory 2515, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the virtual try-on module 115-*c* to implement the present systems and methods may be stored within the system memory 2515. Applications (e.g., application 215) resident with computer system 2500 are generally stored on and accessed via a non-transitory computer readable medium, such as a hard disk drive (e.g., fixed disk 2570) or other storage medium. Additionally, applications can be in the form of electronic signals modulated in accordance with the application and data communication technology when accessed via interface 2585.

Storage interface 2565, as with the other storage interfaces of computer system 2500, can connect to a standard computer readable medium for storage and/or retrieval of information, such as a fixed disk drive 2544. Fixed disk drive 2544 may be a part of computer system 2500 or may be separate and accessed through other interface systems. Network interface 2585 may provide a direct connection to a remote server via a direct network link to the Internet via a POP (point of presence). Network interface 2585 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 25 need not be present to practice the present systems and methods. The devices and subsystems can be interconnected in different ways from that shown in FIG. 25. The operation of a computer system such as that shown in FIG. 25 is readily known in the art and is not discussed in detail in this application. Code to implement the present disclosure can be stored in a non-transitory computer-readable medium such as one or more of system memory 2515 or fixed disk 2570. The operating system provided on computer system 2500 may be iOS®, MS-DOS®, MS-WINDOWS®, OS/2®, UNIX®, Linux®, or another known operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for generating a virtual try-on, the method comprising:
   obtaining, by a processor, a first model, the first model comprising a first set of two or more attachment points and a second set of one or more attachment points, wherein the first model comprises a three-dimensional model of a user's face;
   wherein the first set of attachment points includes at least an attachment point on a first facial feature on the model of a user's face and an attachment point on a second facial feature on the model of a user's face, and wherein the second set of attachment points includes a second attachment point on the first facial feature or on the second facial feature;
   obtaining, by the processor, a second model, the second model comprising a first set of connection points;
   combining, by the processor, the first model and the second model, wherein combining the first and second models comprises matching at least one of the first set of attachment points with at least one of the first set of connection points; and
   rendering, by the processor, an image based on at least a portion of the combined first and second models.

2. The method of claim 1, further comprising:
   receiving an adjustment command; and
   adjusting the combined first and second models based on the adjustment command.

3. The method of claim 2, wherein:
   adjusting the combined first and second models comprises matching the second set of attachment points with the first set of connection points.

4. The method of claim 2, wherein:
   the second model further comprises a second set of connection points; and
   adjusting the combined first and second models comprises matching the first set of attachment points with the second set of connection points.

5. The method of claim 2, wherein:
   the second model further comprises a second set of connection points; and
   adjusting the combined first and second models comprises matching the second set of attachment points with the second set of connection points.

6. The method of claim 2, wherein receiving the adjustment command comprises receiving a touch input.

7. The method of claim 6, wherein the three-dimensional model of the user comprises a morphable model.

8. The method of claim 6, wherein the first set of connection points comprises a nosepiece connection point and at least one earpiece connection point; and
   wherein the first set of attachment points comprises a nose attachment point and an ear attachment point.

9. The method of claim 6, wherein the second model comprises a three-dimensional model of glasses.

10. The method of claim 9, wherein the first set of connection points comprises a nosepiece connection point and at least one temple point.

11. The method of claim 9, wherein the combined first and second models comprises a modeled virtual try-on.

12. The method of claim 1, wherein the first facial feature is an ear of the model of a user's face and the second facial feature is the nose of the model of a user's face;
    wherein the first set of attachment points includes at least a first ear attachment point and at least a first nose attachment point; and
    wherein the second set of attachment points includes at least one of a second nose attachment point relative to said nose or a second ear attachment point relative to said ear.

13. The method of claim 12, wherein the first set of attachment points includes at least a first left ear attachment point, at least a first right ear attachment point, and at least a first nose attachment point; and
wherein the second set of attachment points includes at least a second nose attachment point.

14. The method of claim 13, wherein the first and second sets of attachment points together comprise two or more left ear attachment points, two or more right ear attachment points, and two or more nose attachment points.

15. A computing device configured to generate a virtual try-on, comprising:
a processor;
memory in electronic communication with the processor;
instructions stored in the memory, the instructions being executable by the processor to:
obtain a first model, the first model comprising a first set of two or more attachment points and a second set of one or more attachment points, wherein the first model comprises a three-dimensional model of a user's face;
wherein the first set of attachment points includes at least an attachment point on a first facial feature on the model of a user's face and an attachment point on a second facial feature on the model of a user's face, and wherein the second set of attachment points includes a second attachment point on the first facial feature or on the second facial feature;
obtain a second model, the second model comprising a first set of connection points;
combine the first model and the second model, wherein combining the first and second models comprises matching at least one of the first set of attachment points with at least one of the first set of connection points; and
render an image based on at least a portion of the combined first and second models.

16. The computing device of claim 15, wherein the instructions are further executable by the processor to:
receive an adjustment command; and
adjust the combined first and second models based on the adjustment command.

17. The computing device of claim 16, wherein:
the instructions to adjust the combined first and second models are further executable by the processor to match the second set of attachment points with the first set of connection points.

18. The computing device of claim 16, wherein:
the second model further comprises a second set of connection points; and
the instructions to adjust the combined first and second models are further executable by the processor to match the first set of attachment points with the second set of connection points.

19. The computing device of claim 16, wherein:
the second model further comprises a second set of connection points; and
the instructions to adjust the combined first and second models are further executable by the processor to match the second set of attachment points with the second set of connection points.

20. The computing device of claim 16, wherein the instructions to receive the adjustment command are further executable by the processor to receive a touch input.

21. A computer-program product for generating a virtual try-on, the computer-program product comprising a non-transitory computer-readable medium storing instructions thereon, the instructions being executable by a processor to:
obtain a first model, the first model comprising a first set of two or more attachment points and a second set of one or more attachment points, wherein the first model comprises a three-dimensional model of a user's face;
wherein the first set of attachment points includes at least an attachment point on a first facial feature on the model of a user's face and an attachment point on a second facial feature on the model of a user's face, and wherein the second set of attachment points includes a second attachment point on the first facial feature or on the second facial feature;
obtain a second model, the second model comprising a first set of connection points;
combine the first model and the second model, wherein combining the first and second models comprises matching at least one of the first set of attachment points with at least one of the first set of connection points; and
render an image based on at least a portion of the combined first and second models.

22. The computer-program product of claim 21, wherein the instructions are further executable by the processor to:
receive an adjustment command; and
adjust the combined first and second models based on the adjustment command.

* * * * *